United States Patent
Henricksen et al.

(10) Patent No.: US 9,178,370 B2
(45) Date of Patent: Nov. 3, 2015

(54) COVERAGE ROBOT DOCKING STATION

(71) Applicant: iRobot Corporation, Bedford, MA (US)

(72) Inventors: Craig A. Henricksen, Cambridge, MA (US); Joseph Geringer, Merrimack, NH (US)

(73) Assignee: iRobot Corporation, Bedford, MA (US)

( * ) Notice: Subject to any disclaimer, the term of this patent is extended or adjusted under 35 U.S.C. 154(b) by 355 days.

(21) Appl. No.: 13/729,863

(22) Filed: Dec. 28, 2012

(65) Prior Publication Data

US 2014/0184144 A1    Jul. 3, 2014

(51) Int. Cl.
*H02J 7/00* (2006.01)
*G06F 17/00* (2006.01)
*G06F 19/00* (2011.01)
*B25J 9/00* (2006.01)
*G05D 1/02* (2006.01)

(52) U.S. Cl.
CPC ............. *H02J 7/0044* (2013.01); *B25J 9/0003* (2013.01); *A47L 2201/02* (2013.01); *A47L 2201/022* (2013.01); *G05D 1/0225* (2013.01)

(58) Field of Classification Search
CPC .... G05D 1/0225; B25J 9/0003; H02J 7/0044; A47L 2201/02
USPC ................... 320/107, 113–115; 15/319, 320; 700/245, 258
See application file for complete search history.

(56) References Cited

U.S. PATENT DOCUMENTS

| | | | |
|---|---|---|---|
| 5,940,927 A | 8/1999 | Haegermarck | |
| 6,389,329 B1 | 5/2002 | Colens | |
| 6,532,404 B2 | 3/2003 | Colens | |
| 6,594,844 B2 | 7/2003 | Jones | |
| 6,690,134 B1 | 2/2004 | Jones et al. | |
| 6,781,338 B2 | 8/2004 | Jones et al. | |
| 6,809,490 B2 | 10/2004 | Jones et al. | |
| 6,965,209 B2 | 11/2005 | Jones et al. | |
| 7,155,308 B2 | 12/2006 | Jones | |
| 7,173,391 B2 | 2/2007 | Jones et al. | |
| 7,196,487 B2 | 3/2007 | Jones et al. | |
| 7,332,890 B2 * | 2/2008 | Cohen et al. | 320/109 |
| 7,388,343 B2 | 6/2008 | Jones et al. | |
| 7,389,156 B2 * | 6/2008 | Ziegler | A22C 17/0013 318/568.1 |
| 7,448,113 B2 | 11/2008 | Jones et al. | |
| 7,571,511 B2 | 8/2009 | Jones et al. | |
| 7,636,982 B2 | 12/2009 | Jones et al. | |

(Continued)

FOREIGN PATENT DOCUMENTS

WO    WO-2005074362 A2    8/2005

OTHER PUBLICATIONS

International Search Report and Written Opinion for Application No. PCT/US2013/058694 dated Dec. 26, 2013.

(Continued)

*Primary Examiner* — Helen Rossoshek
(74) *Attorney, Agent, or Firm* — Honigman Miller Schwartz and Cohn LLP

(57) ABSTRACT

A coverage robot docking station includes a base having a robot receiving surface. The base defines a power receptacle for receiving a power supply. The base also defines a beacon receptacle for receiving a beacon. A side wall extends from the base, where the side wall and the receiving surface of the base define a robot holder. At least one charging contact is disposed on the robot receiving surface for charging a received robot.

23 Claims, 39 Drawing Sheets

(56) References Cited

U.S. PATENT DOCUMENTS

| | | | |
|---|---|---|---|
| 7,761,954 B2 | 7/2010 | Ziegler et al. | |
| 8,726,454 B2 * | 5/2014 | Gilbert et al. | 15/319 |
| 2002/0016649 A1 | 2/2002 | Jones | |
| 2002/0120364 A1 | 8/2002 | Colens | |
| 2003/0025472 A1 | 2/2003 | Jones et al. | |
| 2004/0020000 A1 | 2/2004 | Jones | |
| 2004/0049877 A1 | 3/2004 | Jones et al. | |
| 2004/0187457 A1 | 9/2004 | Colens | |
| 2004/0207355 A1 | 10/2004 | Jones et al. | |
| 2004/0211449 A1 * | 10/2004 | Yokomoto et al. | 134/61 |
| 2005/0067994 A1 | 3/2005 | Jones et al. | |
| 2005/0204717 A1 | 9/2005 | Colens | |
| 2006/0048800 A1 * | 3/2006 | Rast et al. | 134/56 R |
| 2006/0200281 A1 * | 9/2006 | Ziegler | A22C 17/0013 701/23 |
| 2007/0016328 A1 * | 1/2007 | Ziegler et al. | 700/245 |
| 2007/0061040 A1 * | 3/2007 | Augenbraun et al. | 700/245 |
| 2007/0157415 A1 | 7/2007 | Lee et al. | |
| 2007/0157416 A1 * | 7/2007 | Lee et al. | 15/319 |
| 2007/0157420 A1 * | 7/2007 | Lee et al. | 15/328 |
| 2007/0226949 A1 * | 10/2007 | Hahm et al. | 15/340.1 |
| 2007/0233319 A1 * | 10/2007 | Im et al. | 700/245 |
| 2007/0245511 A1 * | 10/2007 | Hahm et al. | 15/319 |
| 2007/0266508 A1 | 11/2007 | Jones et al. | |
| 2008/0127445 A1 * | 6/2008 | Konandreas et al. | 15/319 |
| 2008/0140255 A1 | 6/2008 | Ziegler et al. | |
| 2008/0155768 A1 | 7/2008 | Ziegler et al. | |
| 2008/0201895 A1 * | 8/2008 | Kim et al. | 15/319 |
| 2008/0276408 A1 * | 11/2008 | Gilbert et al. | 15/320 |
| 2008/0282494 A1 * | 11/2008 | Won et al. | 15/319 |
| 2008/0307590 A1 | 12/2008 | Jones et al. | |
| 2009/0228165 A1 * | 9/2009 | Ozick et al. | 701/23 |
| 2009/0254218 A1 * | 10/2009 | Sandin et al. | 700/258 |
| 2009/0281661 A1 * | 11/2009 | Dooley et al. | 700/258 |
| 2010/0011529 A1 | 1/2010 | Won et al. | |
| 2010/0037418 A1 * | 2/2010 | Hussey et al. | 15/319 |
| 2010/0049365 A1 | 2/2010 | Jones et al. | |
| 2010/0125968 A1 * | 5/2010 | Ho | 15/319 |
| 2010/0257690 A1 | 10/2010 | Jones et al. | |
| 2010/0257691 A1 | 10/2010 | Jones et al. | |
| 2010/0263158 A1 | 10/2010 | Jones et al. | |
| 2011/0167574 A1 * | 7/2011 | Stout et al. | 15/3 |
| 2011/0202175 A1 * | 8/2011 | Romanov et al. | 700/250 |
| 2011/0271469 A1 * | 11/2011 | Ziegler et al. | 15/97.1 |
| 2012/0167917 A1 * | 7/2012 | Gilbert | 134/6 |
| 2012/0180254 A1 * | 7/2012 | Morse et al. | 15/345 |
| 2012/0222224 A1 * | 9/2012 | Yoon et al. | 15/52.1 |
| 2012/0291809 A1 * | 11/2012 | Kuhe | A47L 5/24 134/18 |
| 2013/0011234 A1 * | 1/2013 | Pretlove et al. | 414/749.1 |
| 2013/0073088 A1 | 3/2013 | Lee | |
| 2013/0127397 A1 * | 5/2013 | Larsen et al. | 320/103 |
| 2013/0138247 A1 | 5/2013 | Gutmann | |
| 2013/0206170 A1 * | 8/2013 | Svendsen et al. | 134/6 |
| 2013/0261867 A1 * | 10/2013 | Burnett et al. | 701/23 |
| 2014/0215735 A1 * | 8/2014 | Gilbert et al. | 15/98 |
| 2014/0259511 A1 * | 9/2014 | Ziegler et al. | 15/319 |

OTHER PUBLICATIONS

<https://web.archive.org/web/20120919195433/http:/mintcleaner.com/features/mint-plus/> Archive date: Sep. 19, 2012.

* cited by examiner

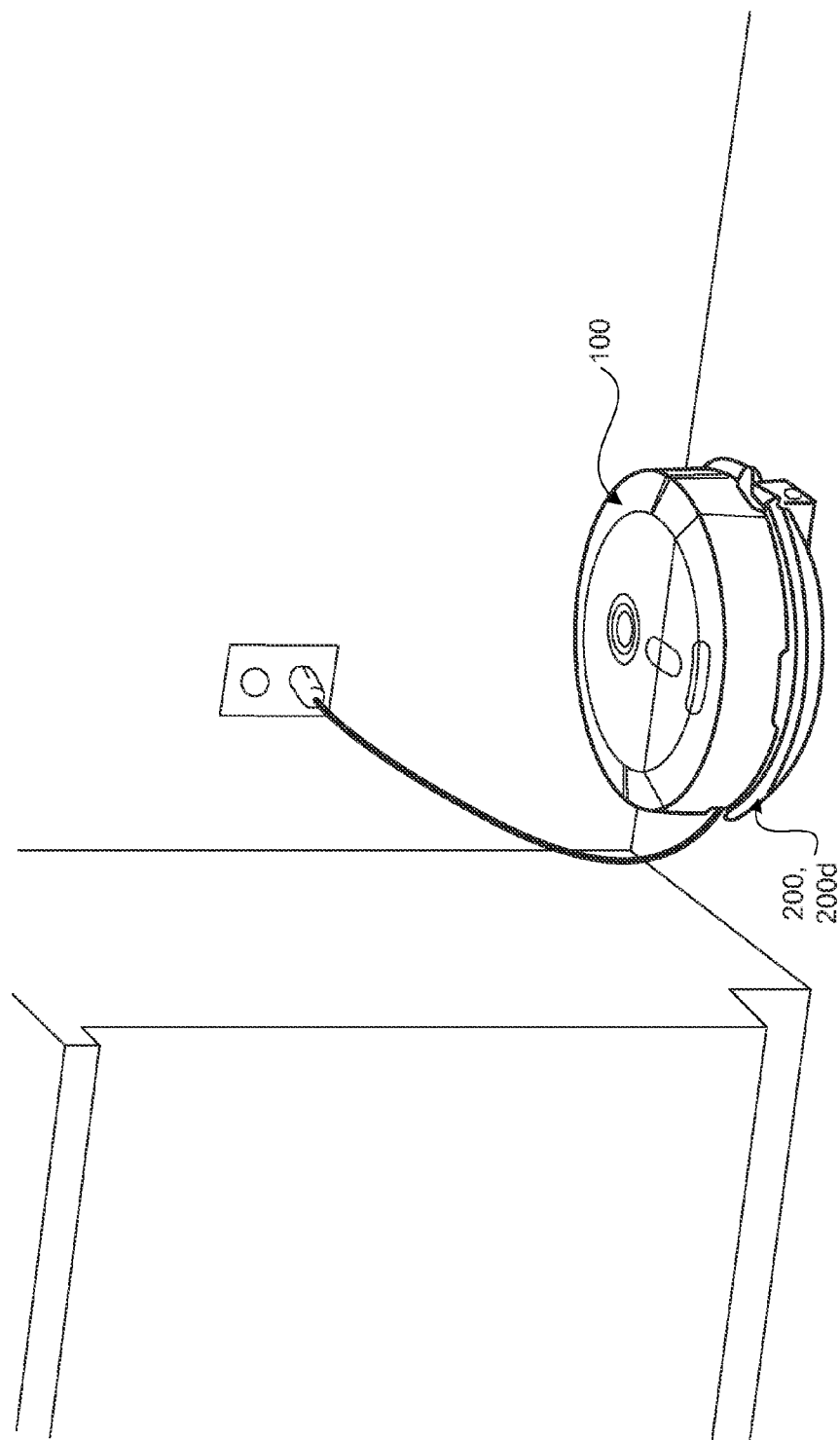

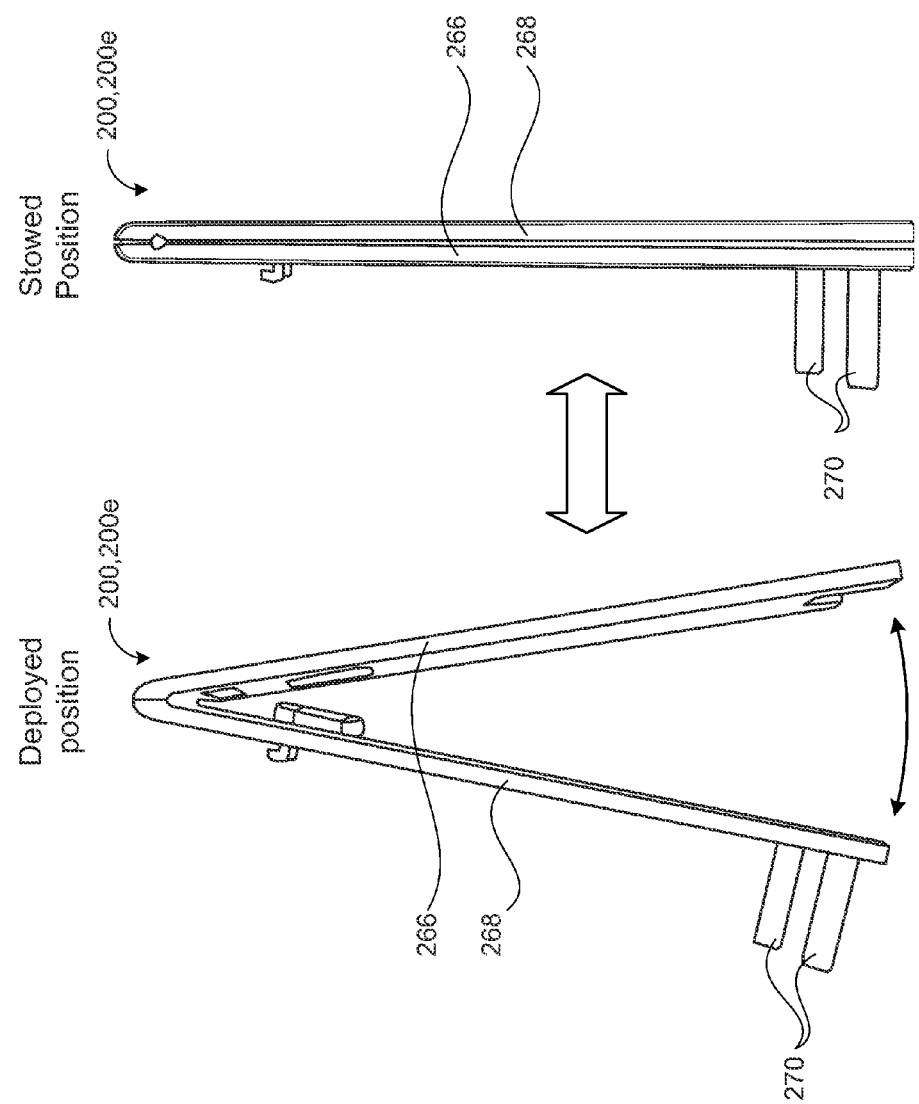

COVERAGE ROBOT DOCKING STATION

TECHNICAL FIELD

This disclosure relates to docking stations for surface cleaning robots.

BACKGROUND

Manual methods of cleaning floors can be labor intensive and time consuming. Thus, in many large buildings, such as hospitals, large retail stores, cafeterias, and the like, floors are wet cleaned on a daily or nightly basis. Industrial floor cleaning "robots" capable of wet cleaning floors have been developed to implement wet cleaning techniques required in large industrial areas. These robots are typically large, costly, and complex. Because these industrial-sized wet cleaning devices weigh hundreds of pounds, these devices are usually attended by an operator. For example, an operator can turn off the device and, thus, avoid significant damage that can arise in the event of a sensor failure or an unanticipated control variable.

Home floor cleaning robots allow autonomous floor cleaning in a home setting without the need for an industrial machine. Although some home floor cleaning robots may operate autonomously, they may need manual maintenance, such as battery charging.

SUMMARY

A docking stating may receive a coverage robot, such as an autonomous home floor cleaning robot, for storage, transport, maintenance, and/or charging. The docking station may provide a power supply for charging the received robot. Moreover, the docking station may house robot accessories, such as a portable power supply, navigation beacon(s), cleaning tools, etc.

One aspect of the disclosure provides a coverage robot docking station that includes a base having a robot receiving surface, the base defining a power receptacle for receiving a power supply, the base further defines a beacon receptacle for receiving a beacon. The coverage robot docking station also includes a side wall extending from the base. The side wall and the receiving surface of the base define a robot holder. At least one charging contact is disposed on the robot receiving surface for charging a received robot.

Implementations of the disclosure may include one or more of the following features. In some implementations, the side wall defines an arcuate shape complimenting a shape of the received robot. Additionally or alternatively, the side wall defines a frustoconical shape. In some examples, the side watt defines at least one cut-out forming a first side wall portion and a second side wall portion. The first and second side wall portions may further each define a handle aperture for carrying the coverage docking station. The base may include an annular rim confining the received robot on the robot receiving surface and the side wall may extend from the annular rim away from the robot receiving surface. Two or more legs may be disposed on the side wall and arranged for supporting the coverage robot docking station in a tilted standing position partially resting on the side wall.

In some implementations, the power receptacle releasably retains the power supply. The power receptacle may include at least one retaining clip releasably engaging and retaining the received power supply. In some examples, the at least one retaining clip is spring biased.

In some implementations, the beacon receptacle releasably retains the beacon. The beacon receptacle may include at least one retaining clip releasably engaging and retaining the received beacon. In some examples, the at least one retaining clip is spring biased.

The coverage docking station may include a cover releasably attachable to the side wall. The cover and the robot holder together define a volume for housing the received robot. In some examples, at least one of the base and the side wall is treated with anti-bacterial coating or a superhydrophobic coating.

The coverage docking station may include a wall mount fixture attached to a back surface of the side wall for attaching the coverage robot docking station to a wall mount. The coverage docking station may further include a robot retainer disposed on the robot receiving surface for retaining the received robot in a docked position. The robot retainer may have a nozzle for blowing air into the robot.

In some Implementations, the side wall is arranged at a 90° angle with respect to the robot receiving surface. The robot receiving surface may extend along at least a portion of the side wall. A band may be disposed on the side wall The band and the side wall together define a robot receiver arranged to receive and support the received robot in a vertical position while resting on the robot receiving surface. The side wall may define a handle aperture near a distal end of the side wall for carrying the coverage docking station with the received robot in a vertical position. A watt mount fixture may be attached to a back surface of the side wall for attaching the coverage robot docking station to a wall mount.

Another aspect of the disclosure provides a coverage robot docking station that includes a base having a robot receiving surface. The base defines a power receptacle for receiving a power supply, a beacon receptacle for receiving a beacon, and a handle aperture for carrying the coverage docking station. An annular rim protrudes from the robot receiving surface. At least one charging contact is disposed on the robot receiving surface for charging a received robot. The annular rim may releasably retain the received robot.

In some examples, the power receptacle releasably retains the power supply. The power receptacle may include at least one retaining clip releasably engaging and retaining the received power supply. The at least one retaining clip may be spring biased. In some examples, the beacon receptacle releasably retains the beacon. The beacon receptacle may include at least one retaining clip releasably engaging and retaining the received beacon. The at least one retaining clip may be spring biased. The base may be treated with antibacterial coating or a superhydrophobic coating.

A robot retainer may be disposed on the robot receiving surface for retaining the received robot in a docked position. The robot retainer may have a nozzle for blowing air into the robot.

In some implementations, the coverage robot docking station includes a stand disposed on a back surface of the base for supporting the base at an angle relative to a supporting surface. A wall mount fixture may be attached to a back surface of the base for attaching the coverage robot docking station to a wall mount.

Another aspect of the disclosure provides a coverage robot docking station that includes first and second panels, each having first and second end portions, a robot receiving surface, and a back surface opposite to the robot receiving surface. The first end portion of the first panel is pivotally coupled to the second end portion of the second panel. The first and second panels move between a stowed position where the panels are side-by-side substantially parallel to each other, and a deployed position, where the panels are arranged at an angle with respect to each other forming a standing inverted V-frame. The coverage robot docking station further includes at least one charging contact disposed on the robot receiving surface charging a received robot a power supply disposed on the back surface of the first panel and in electric communication with the at least one charging contact. The second panel defines a void to receive the power supply when the first and second panels are in the stowed position. At least one support peg is disposed on the robot receiving surface for supporting the received robot in a docked position on the robot receiving surface. At least one of the panels defines a handle aperture for carrying the coverage docking station.

In some examples, the second panel may further include a wall mount fixture attached to a back surface of the side wall for attaching the coverage robot docking station to a wall mount. The robot receiving surface is treated with anti-bacterial coating or a superhydrophobic coating.

In yet another aspect, a coverage robot docking station includes a base having a robot receiving surface and a side wall extending from the base. The side wall and the receiving surface of the base define a trough sized and shaped for capturing droplets of fluid from wet components of a coverage robot received on the robot receiving surface. The docking station also includes an air mover arranged to move air onto the received coverage robot and a robot detector arranged to detect the presence of the received coverage robot. The robot detector activates the air mover upon detecting the presence of the received coverage robot.

In some implementations, the air mover is positioned adjacent wet components (e.g., brush, wetting element, smearing device, fluid nozzles, etc.) of the received coverage robot. The air mover may be a fan having a nozzle disposed in the robot receiving surface to move air onto the wet components of the received coverage robot. In some examples, the air mover directs a stream of air across the wet components of the coverage robot such that droplets of fluid are moved from the wet components to the trough. Moreover, the air mover may direct a heated stream of air across the wet components of the coverage robot, for example, to quickly dry the wet components. In some implementations, the air mover is an exhaust fan housed in the coverage robot and the receiving surface directs a heated stream of exhaust air across the wet components of the coverage robot.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 4E is a perspective view of the coverage robot docking station shown in FIG. 4A with a docket robot laying on a flat surface being charged.

FIG. 5C is a perspective view of the coverage robot docking station shown in FIG. 5A moving between a stowed position and a deployed position.

Like reference symbols in the various drawings indicate like elements.

DETAILED DESCRIPTION

Figure 1A:
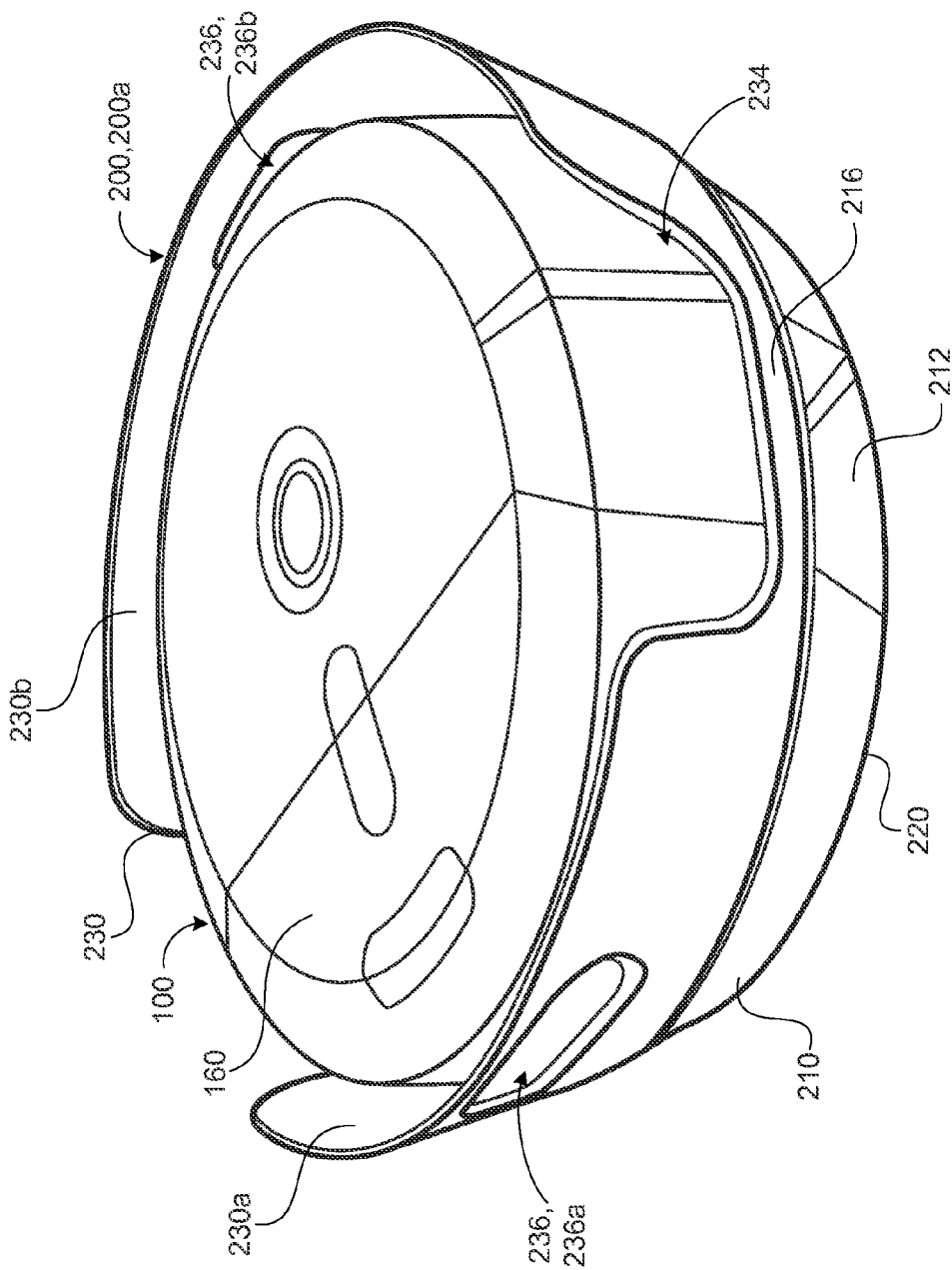
FIG. 1A is a perspective view of an exemplary coverage robot docking station with a docket robot.

An autonomous robot movably supported can clean a surface while traversing that surface. The robot can remove wet debris from the surface by agitating the debris and/or wet clean the surface by applying a cleaning liquid to the surface, spreading (e.g., smearing, scrubbing) the cleaning liquid on the surface, and collecting the waste (e.g., substantially all of the cleaning liquid and debris mixed therein) from the surface.

A docking station 200 designed to store a robot 100 allows the user to easily carry the docking station 200 while housing the robot 100. In addition, the docking station may be plugged into an electrical outlet, thus continuously charging the robot while housed in the docking station 200. The continuous charging is advantageous because it extends the life of the robot 100. Other advantages of the docking station 200 include preventing water spills when housing a robot with a liquid container, both while stationary or being carried by a user.

Referring to FIGS. 1A-1H, in some implementations, a docking station 200, 200a for a robot 100 includes a base 210 having a receiving surface 250, a side wall 230 which together with the receiving surface 250 form a robot holder 232. The robot holder 232 may be a trough sized and shaped for capturing droplets of fluid from wet components of a coverage robot received on the robot receiving surface 250. The docking station 200a may include a pair of charging contacts 252 for charging the robot 100 when the docking station 200a is plugged into an electrical outlet 10.

In the example shown, the base 210 defines a complimentary shape of the robot 100 from a top view; however, the base may define other non-complimentary shapes of the robot 100 (e.g., circular, rectangular, square, oval). Moreover, the robot holder 232 may define a shape conducive for receiving and collecting water droplets form the received robot 100.

Figure 1B:
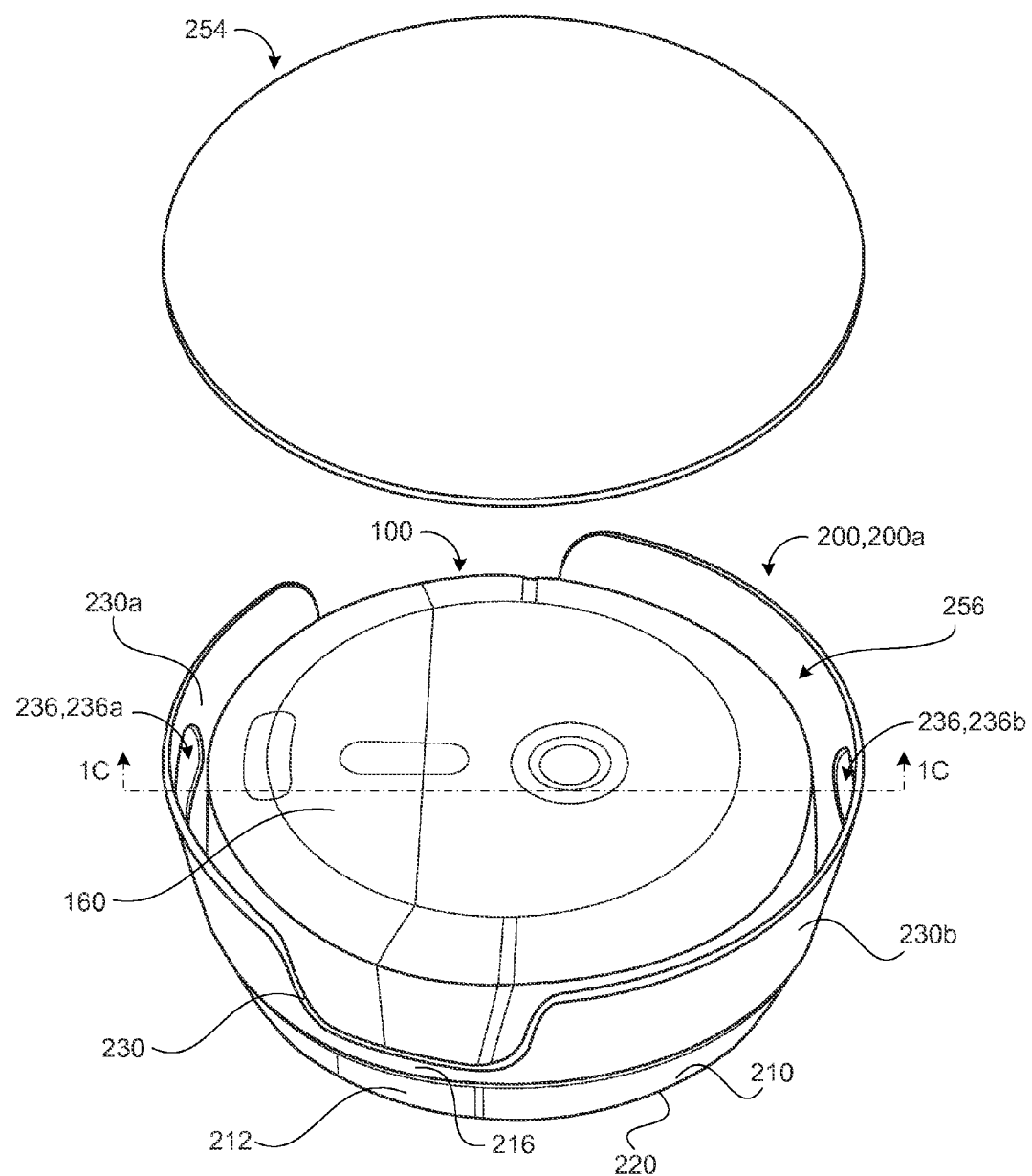
FIG. 1B is a perspective view of the coverage robot docking station shown in FIG. 1A with a docked robot and a cover.
Figure 1C:
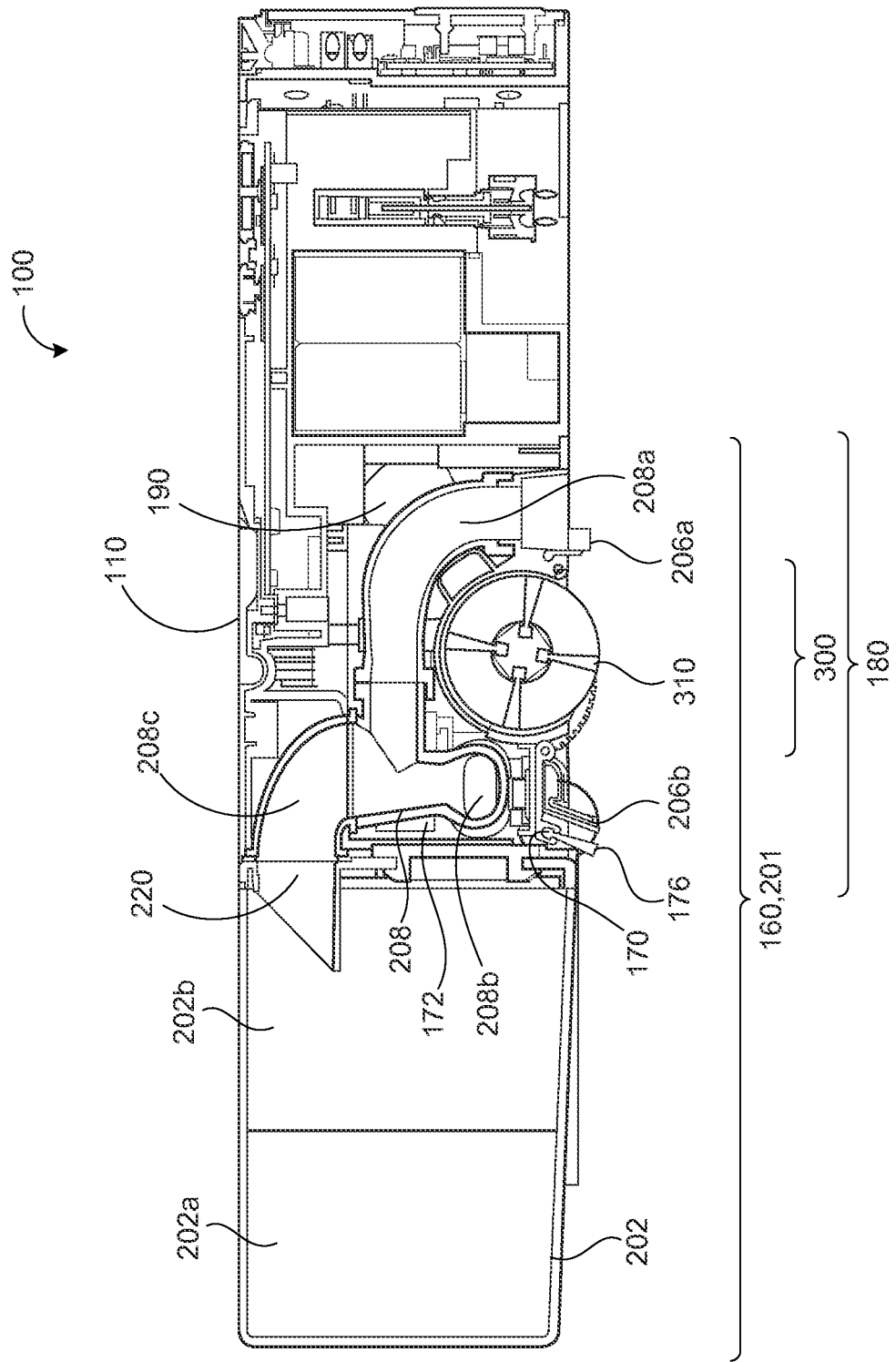
FIG. 1C is a section view of the exemplary robot shown in FIG. 1B.

FIG. 1C illustrates an exemplary robot 100 that includes a cleaning system 160 having a wet cleaning subsystem 201 and/or a dry cleaning subsystem 300 carried by a robot body 110. The wet and dry subsystems 201, 300 may operate together or independently. When operating together the two subsystems 201, 300 may share one or more components, such as passageways or a collection bin. The wet cleaning subsystem 200 may have a liquid volume 202 that includes a supply volume 202a and a collection volume 202b, for storing clean fluid and waste fluid, respectively. The air mover 280 of the docking station 200 may be arranged to dry one or more components of the wet and/or dry cleaning subsystems 201, 300.

The wet cleaning system 201 may include a fluid applicator 170 in fluid communication with the supply volume 202a and carried by the robot body 110 rearward of the dry cleaning subsystem 300. The fluid applicator 170 extends along the transverse axis X and dispenses cleaning liquid onto a supporting surface during wet vacuuming. As the robot 100 maneuvers about the floor surface, a vacuum assembly sucks up previously dispensed liquid and debris suspended therein.

A pump 172 forces cleaning liquid through the fluid applicator 170. In some implementations, a smearing element 176, such as a bristled brush or microfiber cloth, smears or applies a dispensed fluid on the floor surface.

In some implementations, a vacuum module 180 carried by the robot 100 lifts waste (wet or dry) from the floor surface and into the collection volume 202b of the robot 100, leaving behind a wet vacuumed floor surface. The vacuum module 180 may include components of both the wet cleaning subsystem 200 and the dry cleaning subsystem 300. The wet cleaning system 200 may include a wet vacuum squeegee 206b disposed on the vacuum module 180 or the robot body 110 forward of the fluid applicator 170 and extend from the bottom surface 116 of the robot body 110 to movably contact the floor surface 10. In the examples shown, the wet cleaning system 200 includes dry and wet vacuum squeegees 206a, 206b in fluid communication via ducting 208 with an air mover 190 (e.g., fan) and the collection volume 202b. The air mover 190 creates a low pressure region along its fluid communication path including the collection volume 202b and the vacuum squeegees 206a, 206b. The air mover 190 creates a pressure differential across the vacuum squeegees 206a, 206b, resulting in suction of fluid and/or waste from the floor surface 10 and through the vacuum squeegees 206a, 206b.

In the example shown, the wet cleaning system 200 includes first and second ducts 208a, 208b in fluid communication with the dry and wet vacuum squeegees 206a, 206b, respectively. The two conduits 208a, 208b merge to form a common conduit 208c that is in fluid communication with the air mover 190 and the collection volume 202b. The dry vacuum squeegee 206a may include first and second blowers 207a, 207b disposed opposite each other and arranged to move debris to first duct 208a located along the dry vacuum squeegee 206a.

The robot 100 may include a dry cleaning system 300 having a driven roller brush 310 (e.g., with bristles and/or beater flaps) extending parallel to the transverse axis X and rotatably supported by the vacuum module 180 (or, alternatively, the robot body 110) to contact the floor surface, e.g., rearward of the dry vacuum squeegee 206a and forward of the wet vacuum squeegee 206b of the wet cleaning system 200. The driven roller brush 310 agitates debris (and applied fluid) on the floor surface, moving the debris into a suction path of at least one of the vacuum squeegees 206a, 206b (e.g., a vacuum or low pressure zone) for evacuation to the collection volume 202b. Additionally or alternatively, the driven roller brush 310 may move the agitated debris off the floor surface and into a collection bin (not shown) adjacent the roller brush 310 or into one of the ducting 208. The roller brush 310 may rotate so that the resultant force on the floor pushes the robot 100 forward.

Referring again to FIGS. 1A, 1B, and 1D-1H, the docking station 200 may include an air mover 280 arranged to move air onto the received robot 100 and a robot detector 282 arranged to detect the presence of the received robot 100. The robot detector 282 may activate the air mover 280 upon detecting the presence of the received robot 100. In some implementations, the air mover 280 is positioned adjacent wet components (e.g., any components of the cleaning system 160) of the received robot 100. The air mover 280 may be a fan having a nozzle 284 disposed in the robot receiving surface 250 to move air onto the wet components of the received robot 100. In some examples, the air mover 280 directs a stream of air across the wet components of the robot 100 such that droplets of fluid are moved from the wet components to the trough or robot holder 232. Moreover, the air mover 280 may direct a heated stream of air across the wet components of the received robot 100, for example, to quickly dry the wet components. In some implementations, the air mover 280 is an exhaust fan housed in the coverage robot and the receiving surface 250 directs a heated stream of exhaust air across the wet components of the coverage robot 100.

The base 210 may define a power receptacle 212 to releasably retain a power supply 12. The power receptacle can be located in any location of the base 210, as long as a user can easily remove the power supply 12 when needed. The base 210 also defines a beacon receptacle 214 to releasably retain a beacon 14. As shown, the base 210 has one beacon receptacle 214; however, more than one beacon receptacle 214 can be housed within the base 210. The thickness of the base 210 is mostly dictated by the thickness of the power supply receptacle 212 and the thickness of the beacon receptacle 214. Thus, the thicker the power supply receptacle 212 and the thicker the beacon receptacle 214, then the base 210 may be within 0.25 to 1 inch thicker. The base 210 may have a stable back surface 220 for laying the docking station 200a on its back and placing the robot 100 in the robot holder 232.

In the example shown, the receiving surface 250 has a pair of charging contacts 252. While docked in the docking station 200a, the robot 100 may charge when the robot 100 charging contacts (not shown) are in communication with the charging contacts 252 located on the receiving surface 250. Therefore, the charging contacts 252 may be aligned with the robot's charging contacts to allow the robot 100 to charge when received in the docking station 200a.

In the example shown in FIG. 1C, the receiving surface 250 has a robot retainer 258 for retaining the robot on the receiving surface 250; and to prevent it from falling when in an upright position. Even though, the example shows one retainer 258 disposed on the receiving surface; the receiving surface 250 may have more than one retainer 258 independently disposed on the receiving surface 250.

In some implementations, the robot 100 includes a wet cleaning system having a liquid container 160. The liquid container 160 includes a supply container and a collection container, for storing clean fluid and waste fluid, respectively. In use, a user opens a supply port located on the liquid container 160 and pours cleaning fluid into the supply container. The user then closes the supply port (e.g., by tightening a cap over a threaded mouth). The user then sets the robot 100 on the surface to be cleaned and the robot 100 initiates cleaning. The liquid container 160 may be removable from the robot 100; or the liquid container 160 may be integral with the robot body. In the example shown, an annular rim 216 extends from the base 210 and confines the robot receiving surface 250. The side wall 230 extends from the annular rim 216 away from the robot receiving surface 250. However, the annular rim 216 can extend in an upward position perpendicular to the back surface 220 of the base 210. The annular rim 216 catches water drippings from the wet robot 100. Thus, the user does not have to clean water dripping off the floor, and the annular rim 216 protects any electronics of the docking station 200a from water infiltration.

In some implementations, the side wall 230 extends from the annular rim 216 and defines an arcuate shape complementing the shape of the robot 100. However, if the robot 100 is of another shape (e.g., rectangular, square, oval), then the side wall 230 may mimic the shape of the robot 100 (e.g., rectangular, square, oval). In the example shown, the side wall 230 further defines a frustoconical shape; however, the side walls may be of cylindrical shape complementing the robot shape.

The side wall 230 may define two cut-outs 234 forming a first side wall 230a and a second side wall 230b. The cut-outs 234 facilitate placing and removing the robot 100 in and out of the docking station 200a. The cut-outs 234 can be of any shape or size as long as there is enough space for a user to be able to place the robot 100 in and out of the docking station 200a.

Figure 1D:
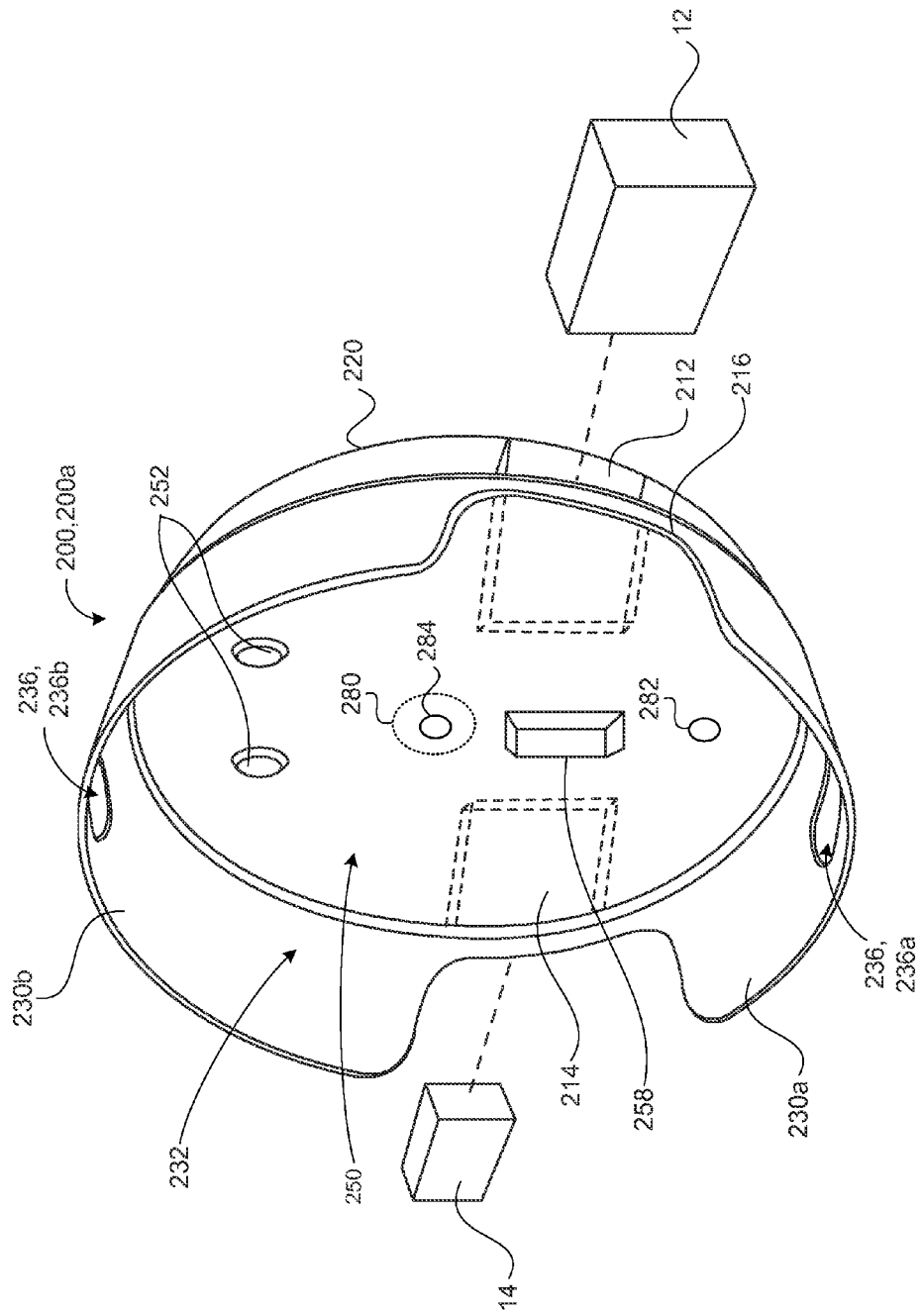
FIG. 1D is a perspective view of the coverage robot docking station shown in FIG. 1A.

In some implementations, the first and second side walls 230a, 230b each define a handle aperture 236, 236a, 236b for carrying the coverage docking station 200a, with or without the robot 100. Each handle aperture 236 is positioned at a distal end of the side wall 230, as shown in FIGS. 1B and 1C. Two handle apertures are shown for the docking station 200a; however, more than two handle apertures 236 may be used by aligning the handle apertures 236 next to one another on the side wall 230 in order to provide flexibility as to which two handles a user may grab. FIG. 1D shows a user carrying the robot docking station 200a with the robot 100 docked into the robot holder 232. However, other carrying mechanisms may be used and include, but are not limited to, cup pull handles, drop pull handles, arch pull handles, or bar pull handles which may be attached to the outside of each side wall 230. If a handle is used instead of an aperture, at least one handle may be used. If only one handle is disposed on a side wall, then the user may carry the robot 100 in a vertical position. However, if two or more handles are disposed on the side wall, then the user may carry the docking station 200a in a similar manner as shown in FIG. 1D.

Figure 1E:
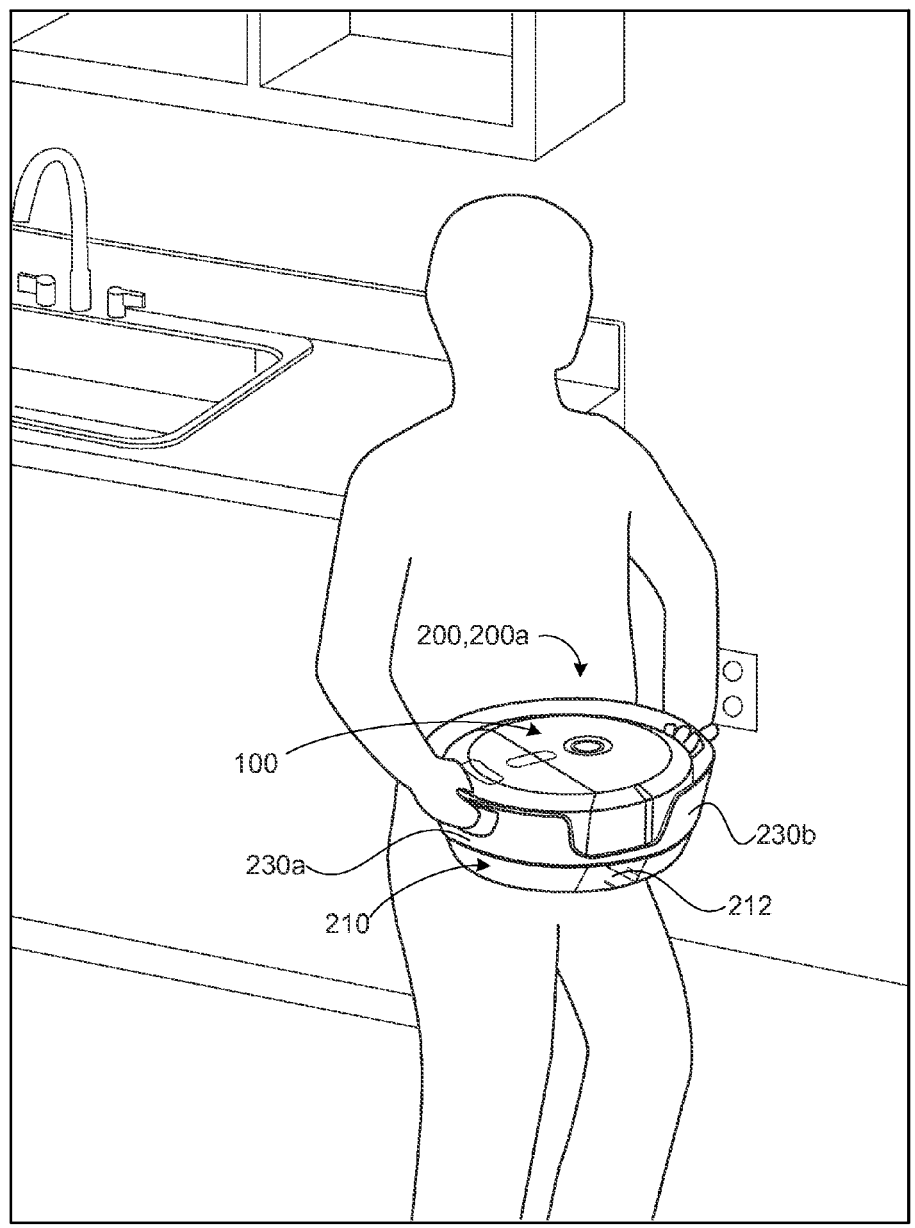
FIG. 1E is a perspective view of the coverage robot docking station shown in FIG. 1A with a docked robot being carried by a user.

Referring to FIGS. 1B and 1E, in some implementations, the docking station 200a may have a cover 254 to store the robot 100 and protect it from dirt. The cover 254 releasably attaches to the side wall 230. Together the cover 254 and the robot holder 232 define a volume 256 to house the robot 100. As shown, the cover has a circular shape complimenting the circular robot 100, the base 210, and the side wall 230. However, the shape of the cover 254 may be different depending on the shape of the robot 100, the base 210, and/or the side wall 230. Some examples of the cover shape may include, but are not limited to, a square, a rectangle, an oval. In some implementations, the side wall may have retaining clips for releasably retaining the cover.

The docking station 200a provides flexibility in movement, placement, and positioning of the robot 100. In some implementations, the docking station 200a has two legs 238 disposed on the side wall 230 for supporting the docking station 200a in a tilted standing position. As shown in FIG. 1E, the docking station 200a is partially resting on the wall while charging. Additionally or alternatively, the docking station 200a may have more than two legs, and may stand on its own without having to lean on the wall. Other support systems may be used to allow positioning of the docking station 200a in an upright position and may include, but are not limited to, foldable legs or detachable legs.

Figure 1F:
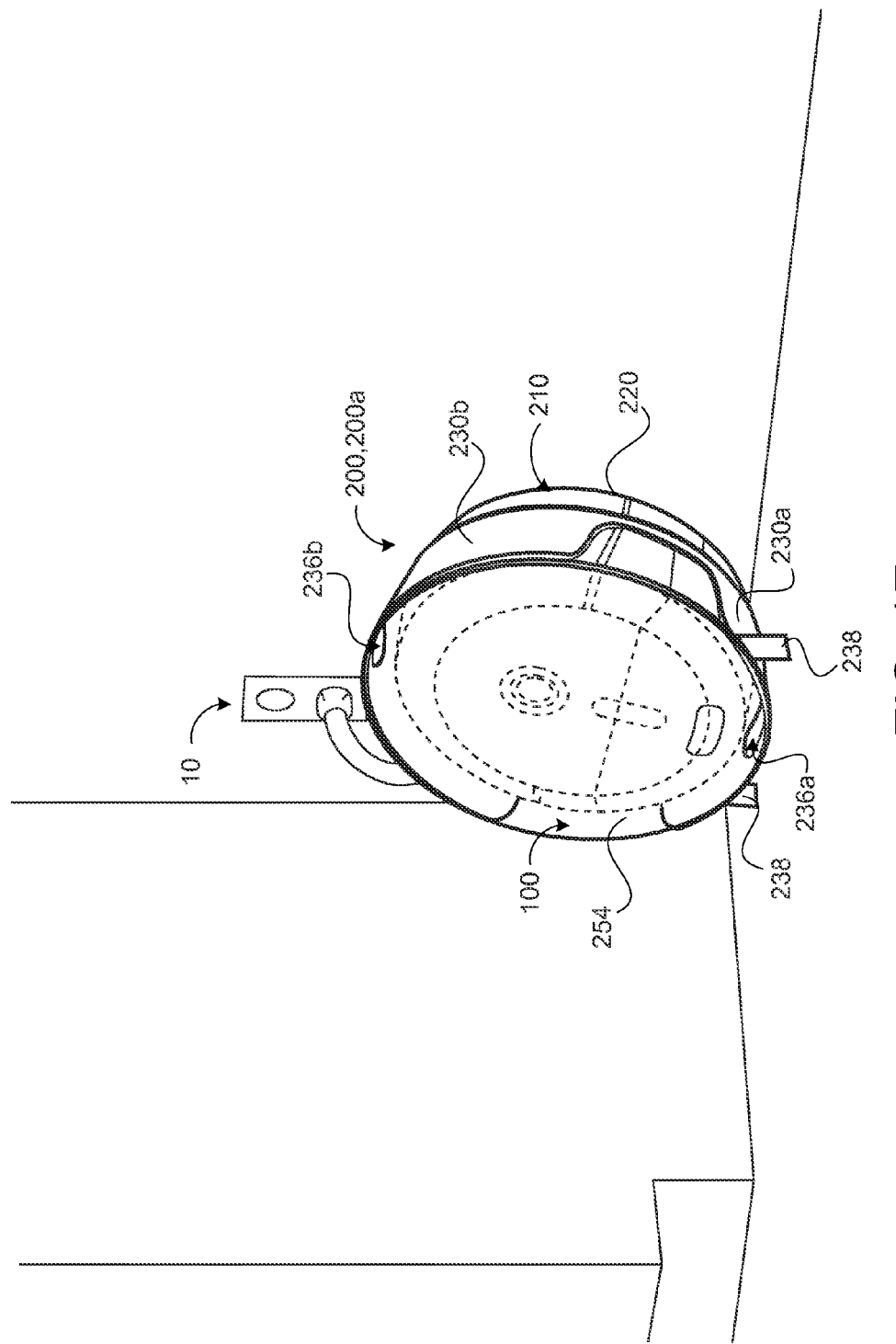
FIG. 1F is a perspective view of the coverage robot docking station shown in FIG. 1A in a standing position.
Figure 1G:
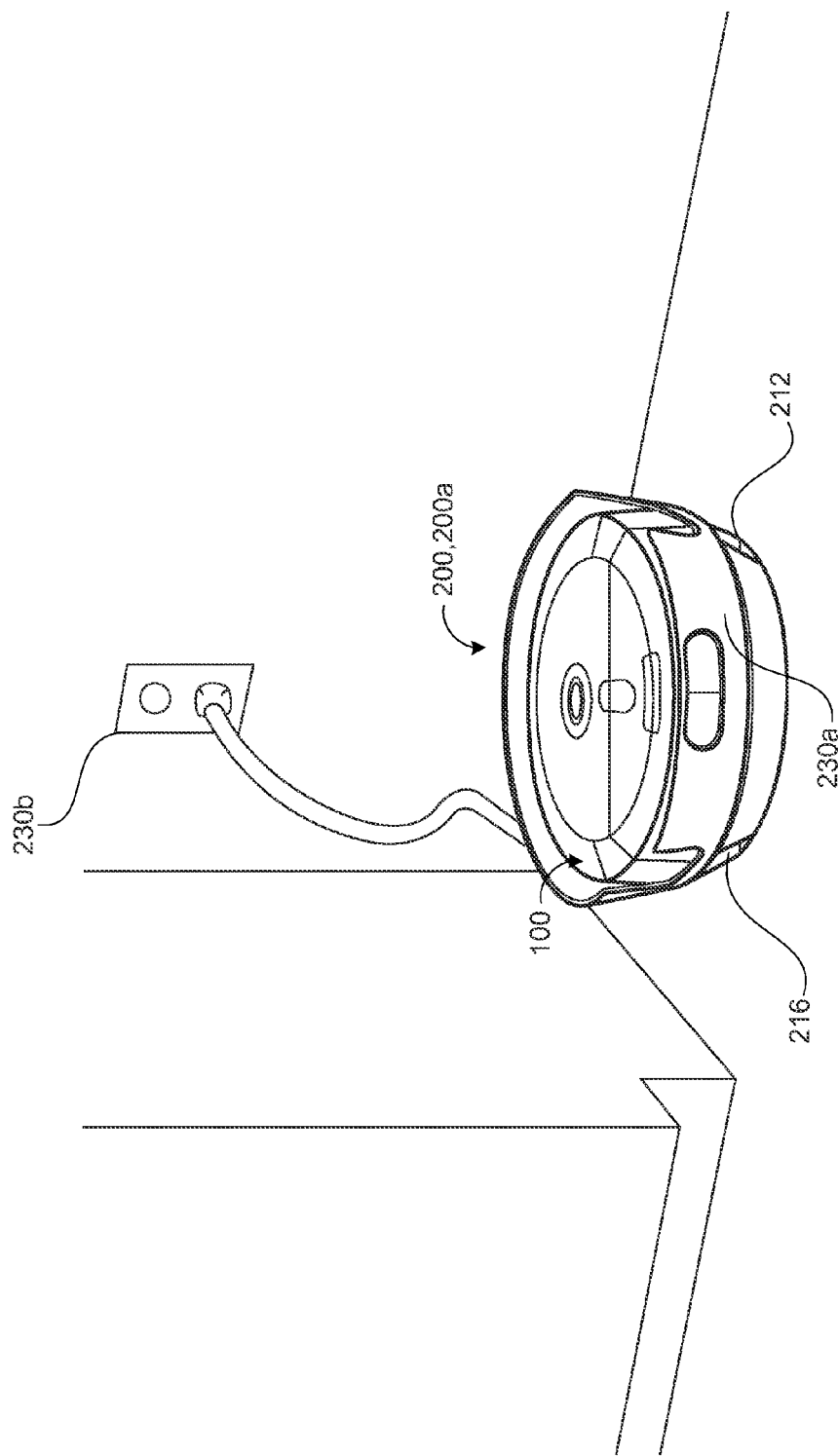
FIG. 1G is a perspective view of the coverage robot docking station shown in FIG. 1A while lying flat on a surface.
Figure 1H:
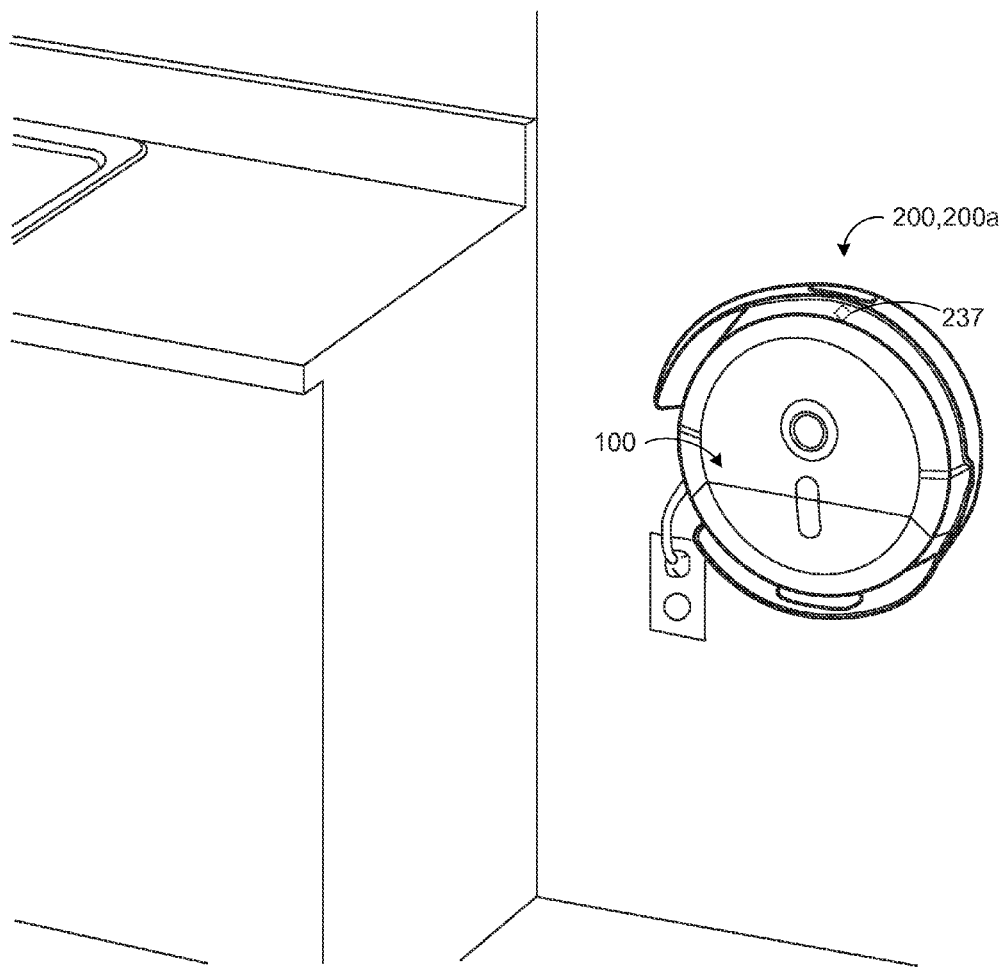
FIG. 1H is a perspective view of the coverage robot docking station shown in FIG. 1A mounted on a wall.

Referring to FIG. 1F, in some implementations, the back surface 220 of the base 210 is flat, allowing the docking station 200a to lay flat on a plane surface. Referring to FIG. 1G, in some implementations, a wall mount fixture 23, is attached to a back surface 220 of the base 210 for attaching the docking station 200a to a wall or wall mount.

Referring to FIGS. 2A-2F, in some implementations, a docking station 200, 200b includes a base 210, a side wall 230, and a pair of charging contacts 252. The base 210 has a receiving surface 250 and a back surface 220 located opposite the receiving surface 250. The robot receiving surface 250 extends along at least a portion of the side wall 230. The robot receiving surface 250 defines a robot receiving aperture 262 having a shape complementary to a portion of the robot 100.

The base 210 may define a power receptacle 212 to releasably retain a power supply 12. The base 210 may also define a beacon receptacle 214 to releasably retain a beacon 14. As shown, both the power receptacle 212 and the beacon receptacle 214 are located on the robot receiving surface 250. However, either one or both the receptacles 212, 214 can be located on any of the sides of the rectangular shaped base. In addition, the base 210 may house more than one beacon receptacle 214 in order to store more than one beacon 14 at a time.

As shown, the base 210 has a rectangular shape; however, the base 210 can be of different shapes including, but not limited to, a square, a circle, an oval, a hexagon, etc. In addition, the power receptacle 212 and/or the beacon receptacle 214 can be located in any of the base 210 shapes listed.

In some implementations, the receiving surface 250 has a pair of charging contacts 252, for continuously charging the robot 100 while in the docking station 200b. The continuous charging of the robot 100 extends the life of the robot 100.

As shown, the side wall 230 extends from the base 210 at a 90° angle. The height of the base 210 may be greater or less than the height of the docked robot 100. The side wall 230 is used to support the robot 100 stationed in the robot receiving aperture 262. The width of the side wall 230 may be between 1 inch and not greater than the width of the base 210. The side wall 230 may be of other shapes (e.g., semi-circular, triangular, trapezoidal, rectangular with the wider width extending from the base 210). In some implementations, a second side wall may extend from the opposite side facing the first side wall, resulting in two side watts to house the robot.

Figure 2A:
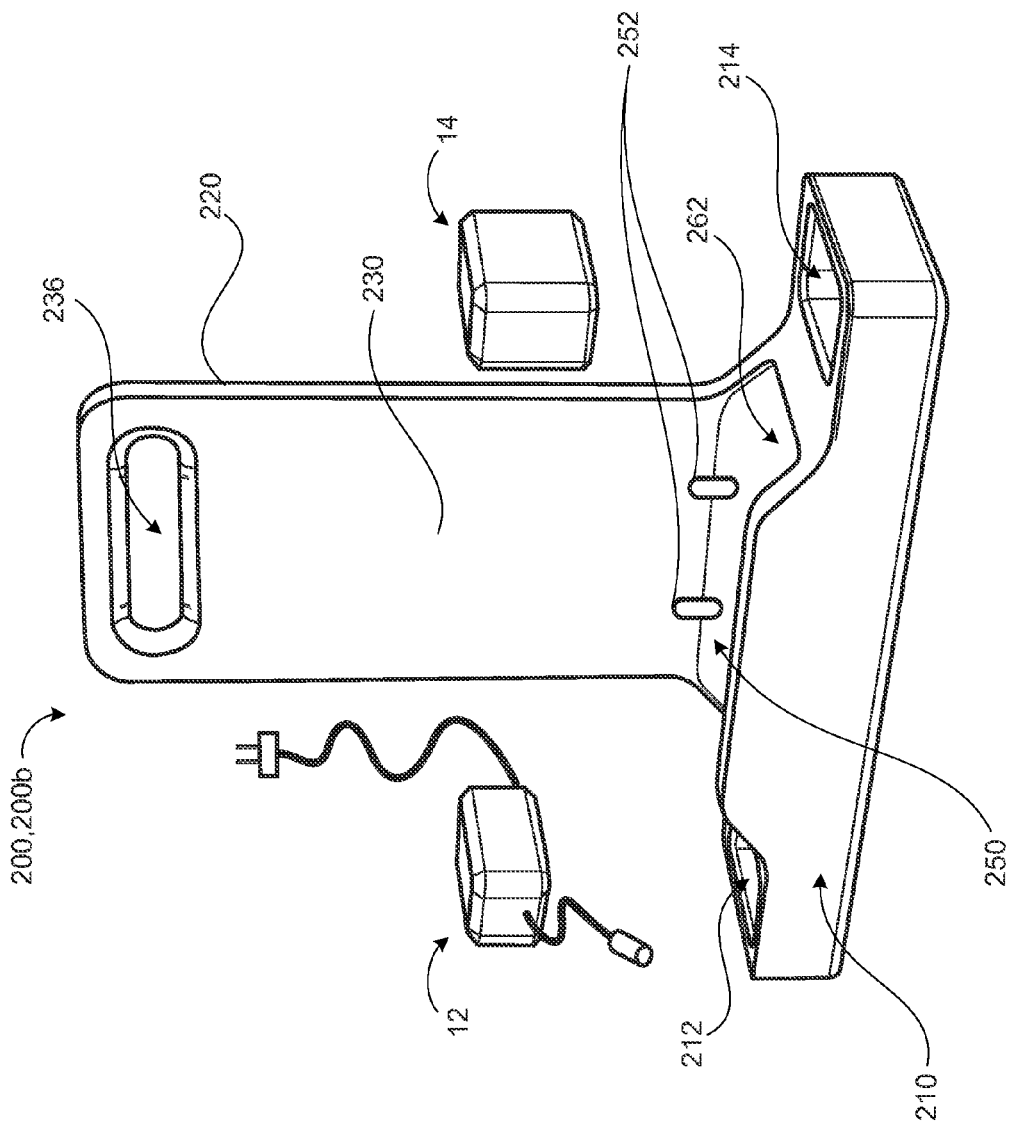
FIG. 2A is a side perspective view of an exemplary coverage robot docking station.
Figure 2B:
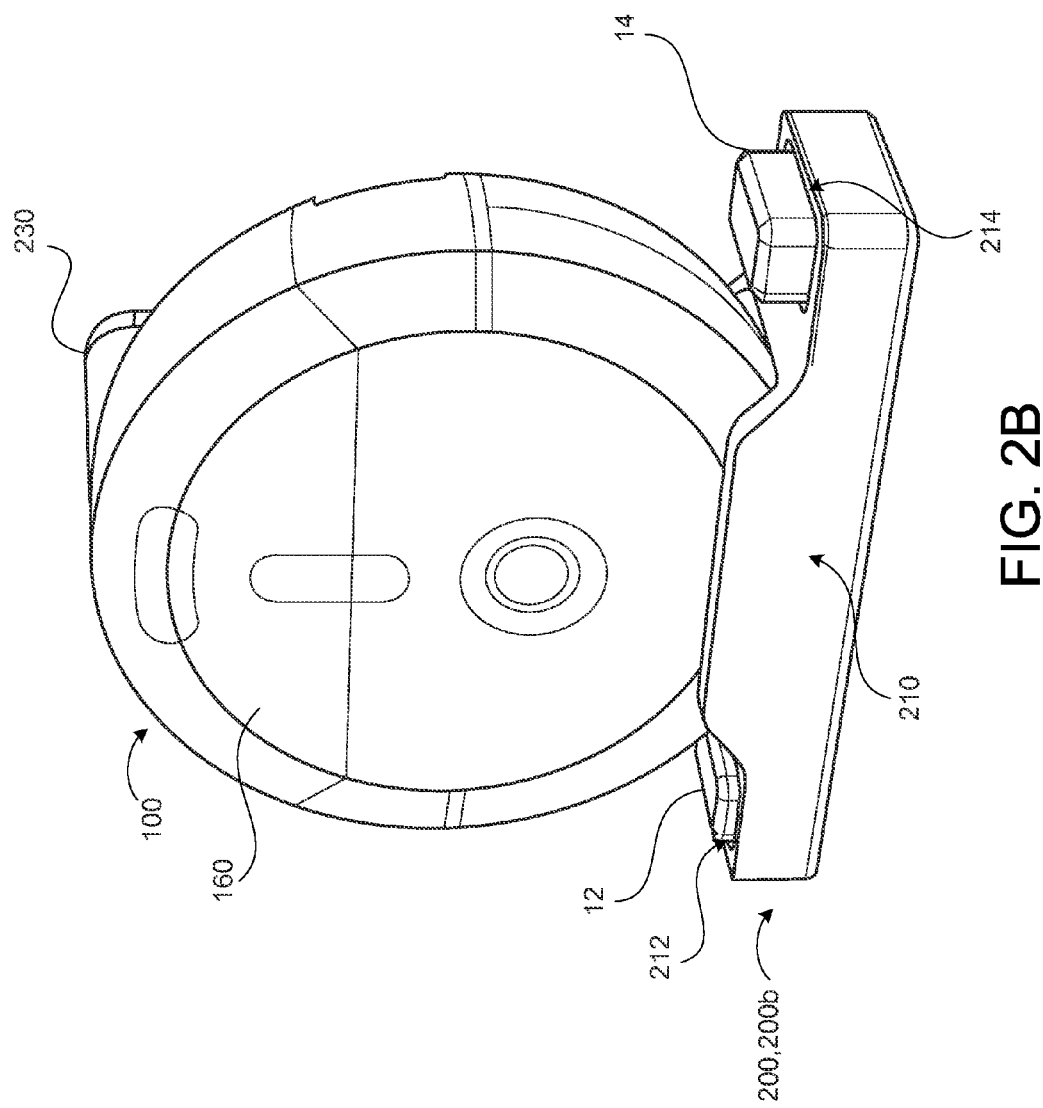
FIG. 2B is a side perspective view of the coverage robot docking station shown in FIG. 2A with a docked robot.

In some implementation, the side wall 230 may define a handle aperture 236 positioned at a distal end of the side wall 230, as shown in FIG. 2A. The handle aperture 236 allows a user to carry the docking station 200b, whether with or without the robot 100, from one location to another. Additionally or alternatively, where the docking station 200b has a second side wall, the second wall may also have a handle aperture 236 positioned at a distal end of the second side wall 230b, therefore, allowing the user to easily lift and early the docking station 200b along with the robot 100. Even though FIG. 2A shows a handle aperture 236, other carrying mechanisms can be used and may include, hut are not limited to, cup pull handles, drop pull handles, arch pull handles, or bar pull handles which may be attached to the outer side of the side wall 230.

Figure 2C:
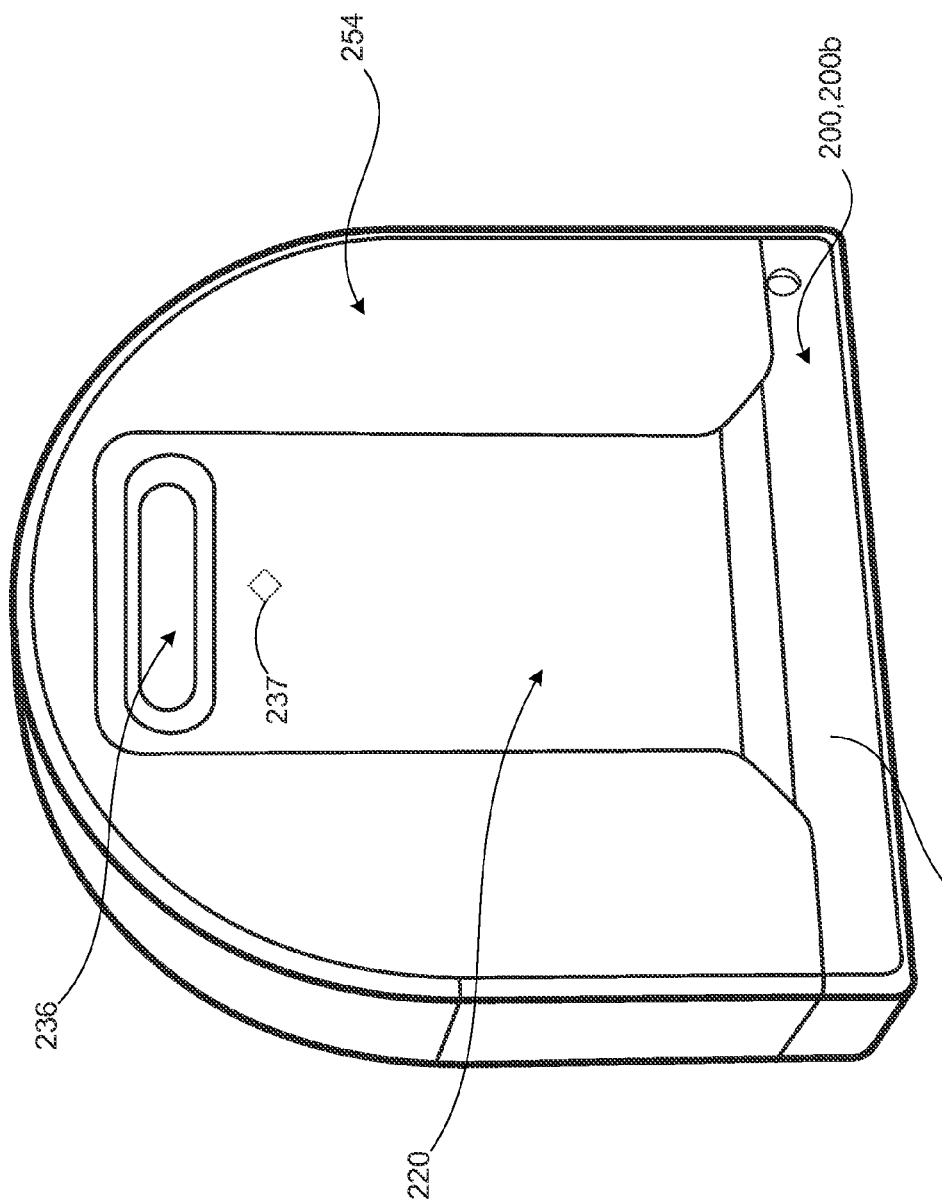
FIG. 2C is a back perspective view of the coverage robot docking station shown in FIG. 2A with a cover.
Figure 2D:
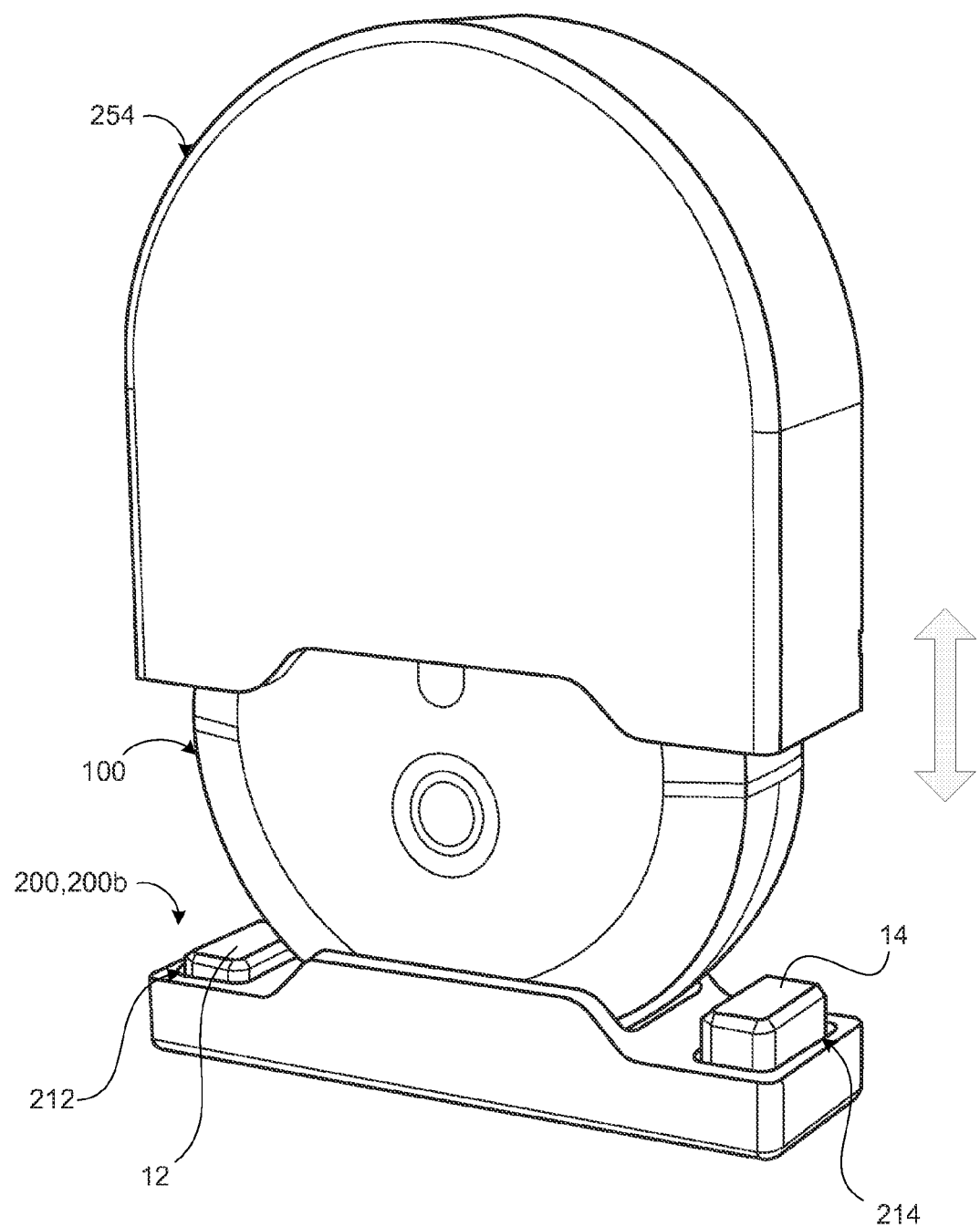
FIG. 2D is a side perspective view of the coverage robot docking station shown in FIG. 2A with a cover being removed.

Referring to FIGS. 2C and 2D, in some implementations, the docking station 200b has a cover 254 to store the robot 100 and to protect it from dirt and dust. The cover 254 may define a shape complementary to the robot 100 with one end releasably attaching to the receiving surface 250. The cover may be of any shape so long as the robot 100 fits inside the cover 254. As shown in FIG. 2C, the cover 254 fits between the robot 100 and the side wall 230. The cover 254 may have grooves to receive the side wall 230 when the cover is covering the robot 100. In some implementations, the receiving surface 250 may further have retaining clips to releasably retain the cover.

Figure 2E:
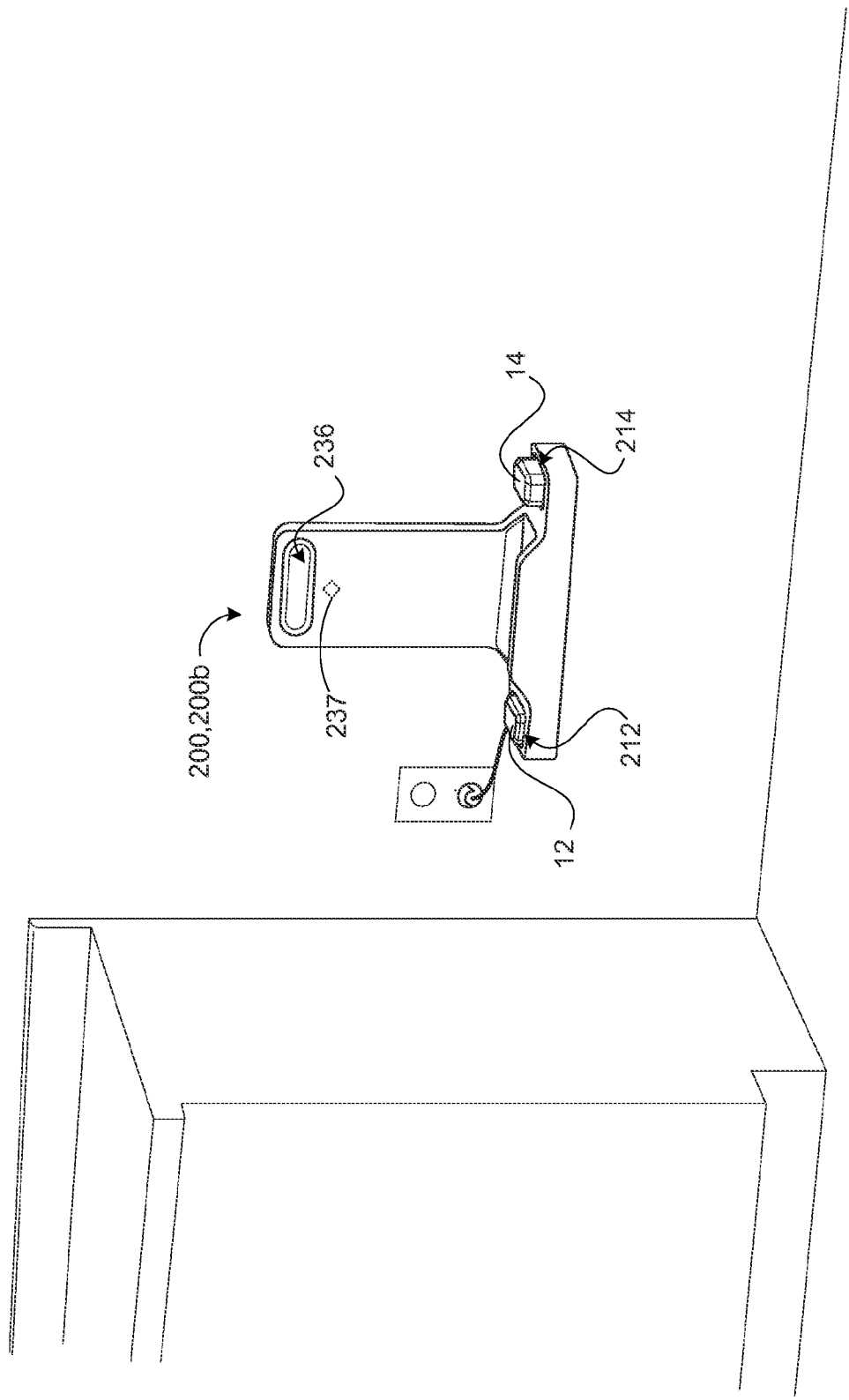
FIG. 2E is a perspective view of the coverage robot docking station shown in FIG. 2A mounted on a wall.

Referring to FIGS. 2C and 2E, in some implementations, a wall mount 237 is attached to the side wall 230 for attaching the docking station 200b to a wall mount. The wall mount 237 may be integrally formed with the side wall 230 or separately attached thereto.

Figure 2F:
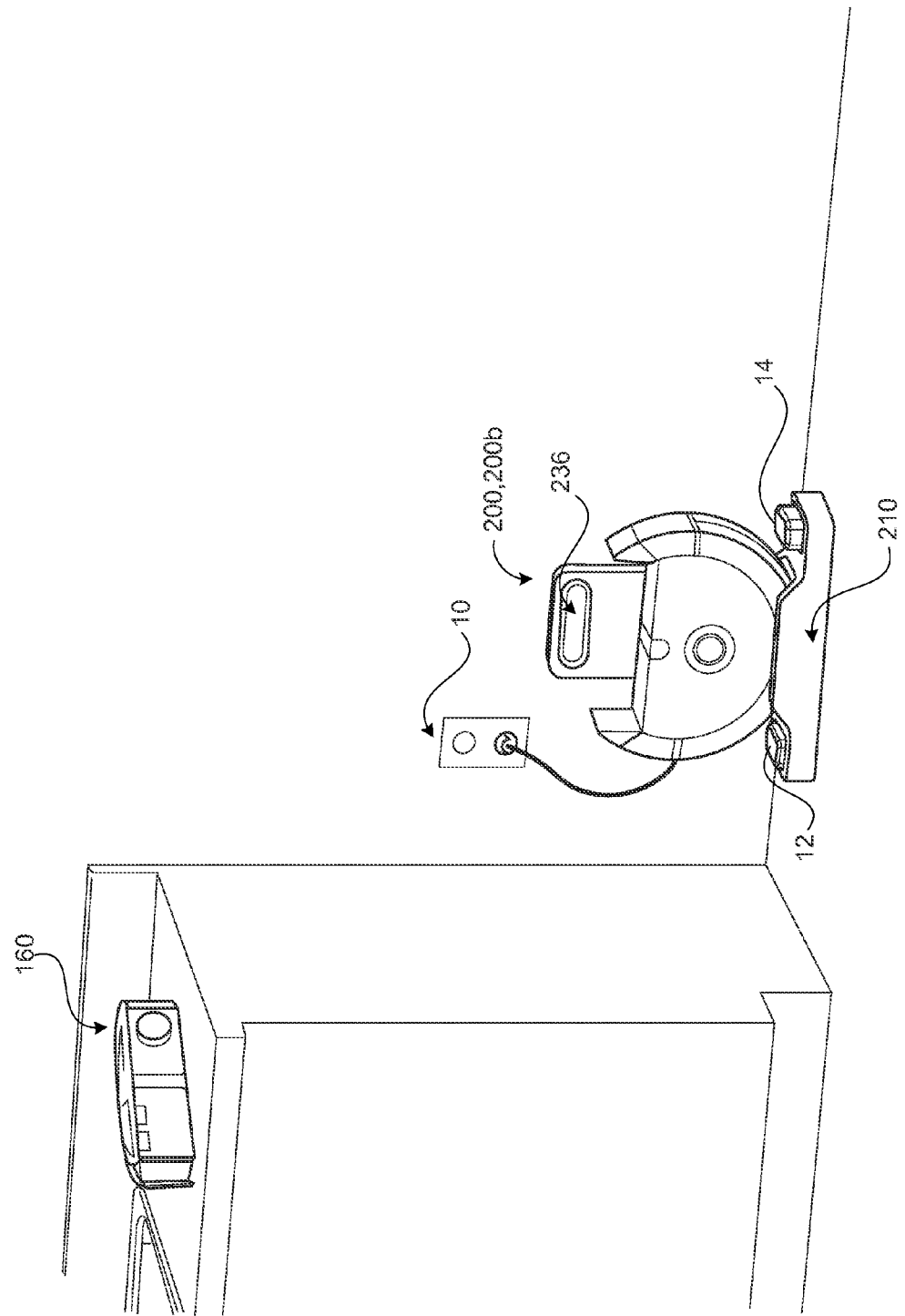
FIG. 2F is a perspective view of the coverage robot docking station shown in FIG. 2A placed on a flat surface with a liquid container removed from a docked robot.

Referring to FIG. 2F, in implementations where the robot 100 includes a wet cleaning system having a removable liquid container 160, it may be beneficial to charge the robot 100 while removing the liquid container 160, for example, to discharge any waste fluid and/or replenish cleaning fluid. In the example shown, the docking station 200b houses the robot 100 where the liquid container 160 is easily detached from the robot 100, while being charged and stored.

Figure 3A:
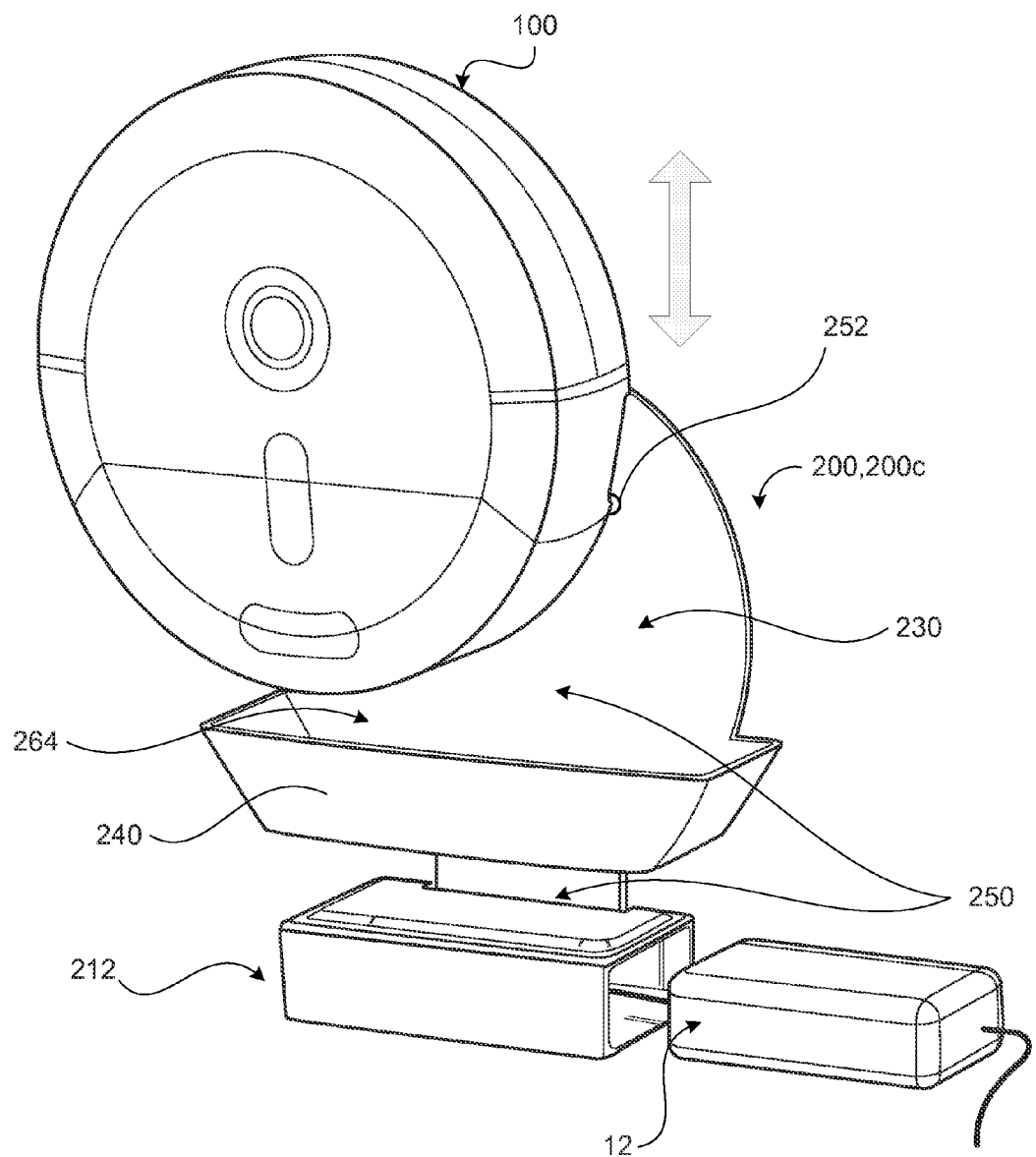
FIG. 3A is a side perspective view of an exemplary coverage robot docking station while docking a robot.
Figure 3B:
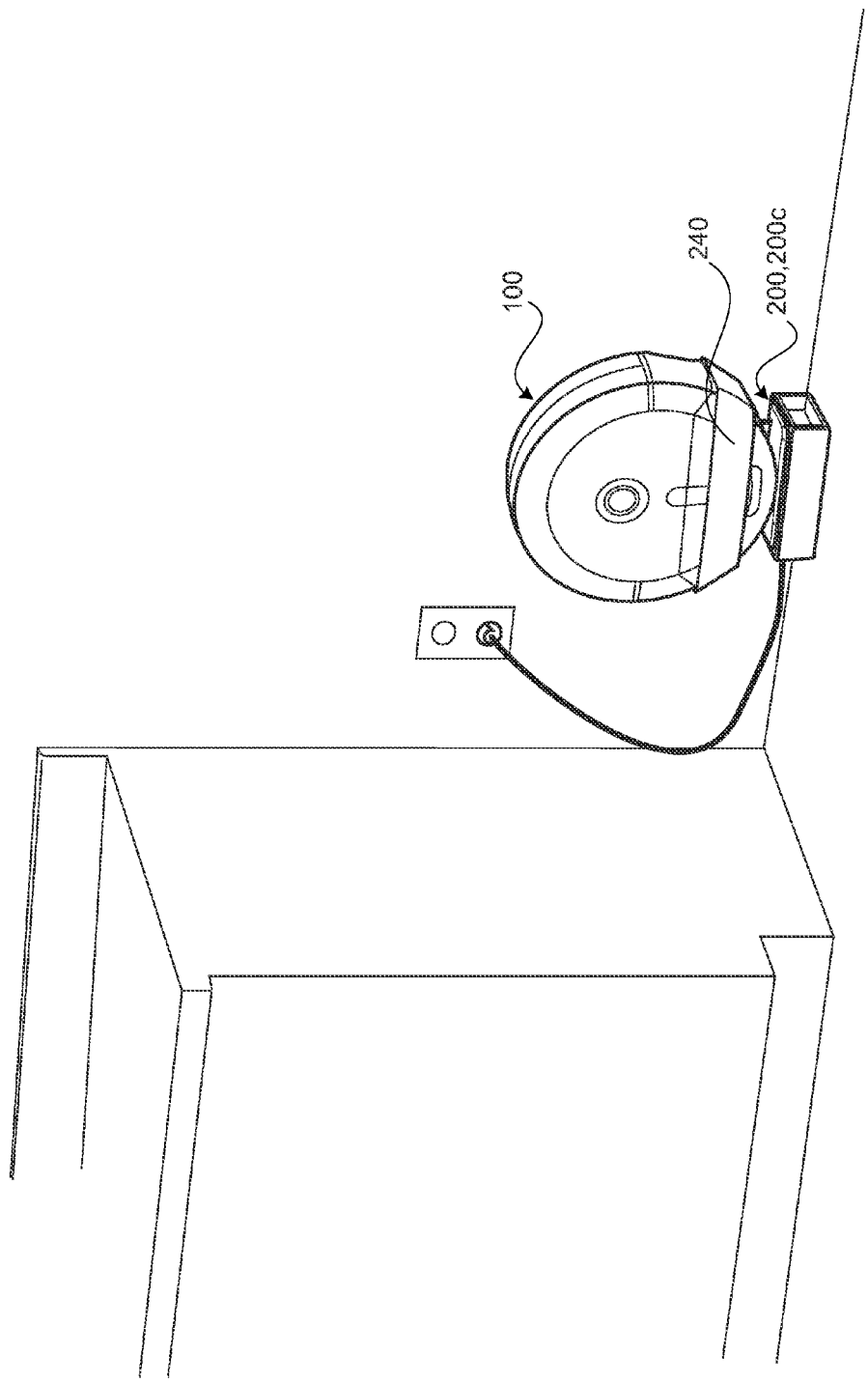
FIG. 3B is a perspective view of the coverage robot docking station shown in FIG. 3A placed on a flat surface with a liquid container removed from a docked robot.

Referring to FIGS. 3A-3F, in some implementations, a docking station 200, 200c includes a base 210, a side wall 230 extending from the base 210 at a 90° angle, a receiving surface 250 extending along at least a portion of the side wall 230, and a pair of charging contacts 252 disposed on the receiving surface 250. As shown, the base 210 has a rectangular block shape with a flat bottom surface allowing it to stand on a planar surface, as shown in FIG. 3B. The docking station 200c defines a power supply receptacle 212 for receiving a power supply 12. Additionally or alternatively, the base 210 may define a beacon receptacle 214 for receiving a beacon 14.

A band 240 is disposed on the side wall 230 and together with the side wall 230 define a robot receiver 264 for receiving a robot 100 for storage. FIG. 3A shows the robot 100 being placed/removed from the docking station 200c.

Figure 3C:
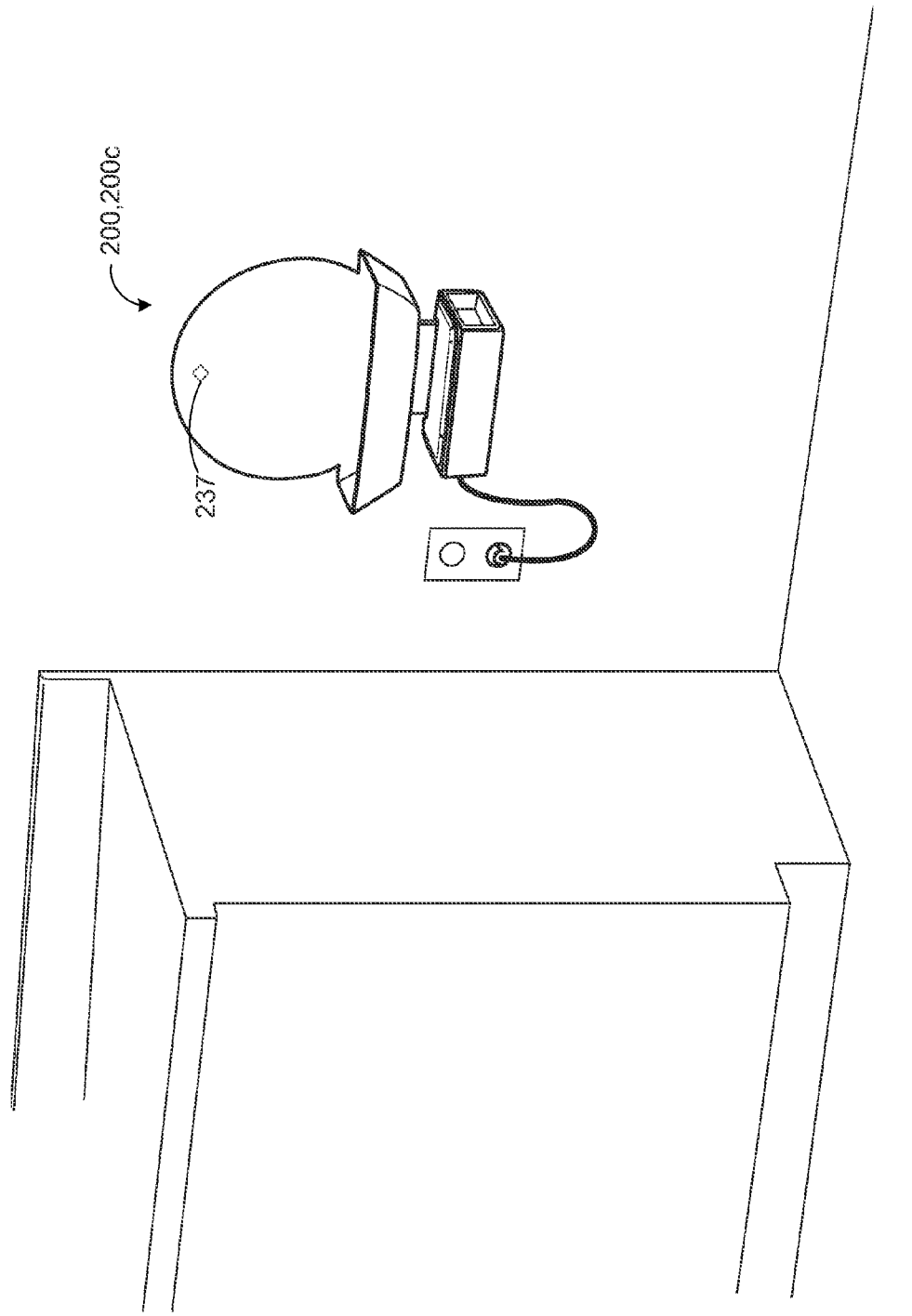
FIG. 3C is a perspective view of the coverage robot docking station shown in FIG. 3A mounted on a wall.

In some implementations, a wall mount fixture 237 may be attached to the side wall for attaching the docking station 200c to a wall mount or wall, as shown in FIG. 3C.

In some implementations, the docking station 200c may have a cover 254 to store the robot 100 and protect it from dirt and dust. The cover 254 releasably attaches to the side wall 230 and the band 240. As shown, the cover 254 has a circular shape to complement the shape of the robot 100. However, the cover 254 may have a non-complimentary shape of the robot 100.

Figure 3D:
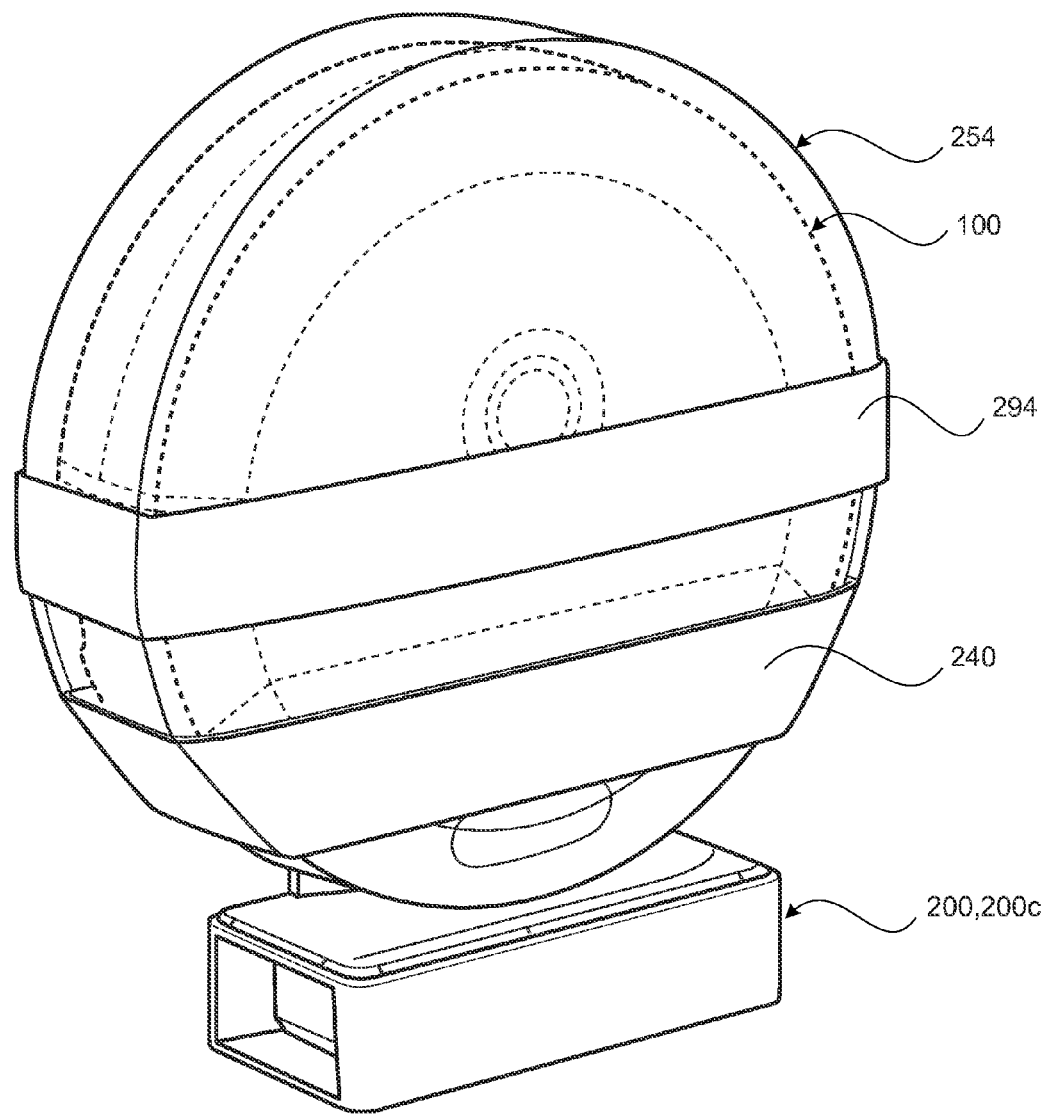
FIG. 3D is a perspective view of exemplary packaging/docking station for a coverage robot.
Figure 3E:
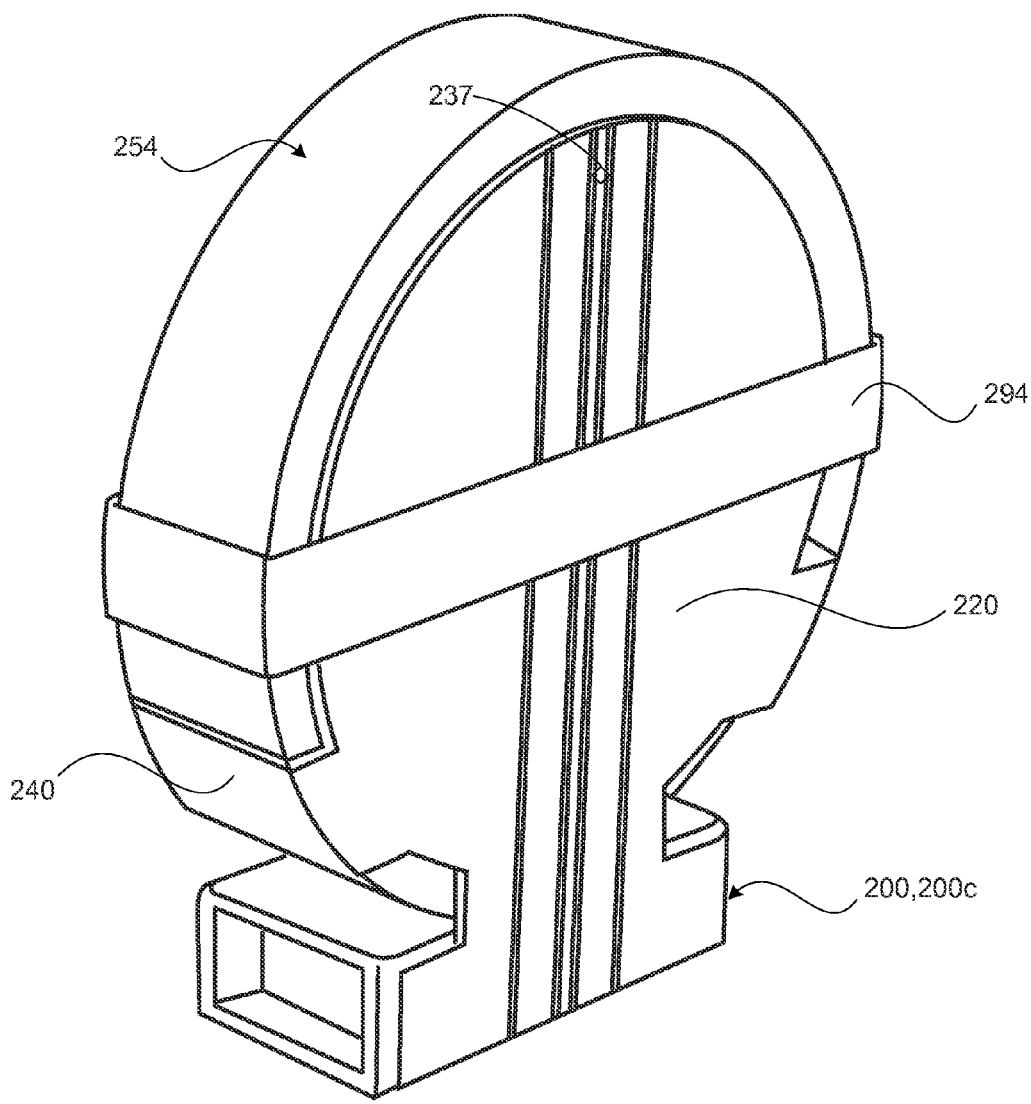
FIG. 3E is a back perspective view of exemplary packaging/docking station for a coverage robot.
Figure 3F:
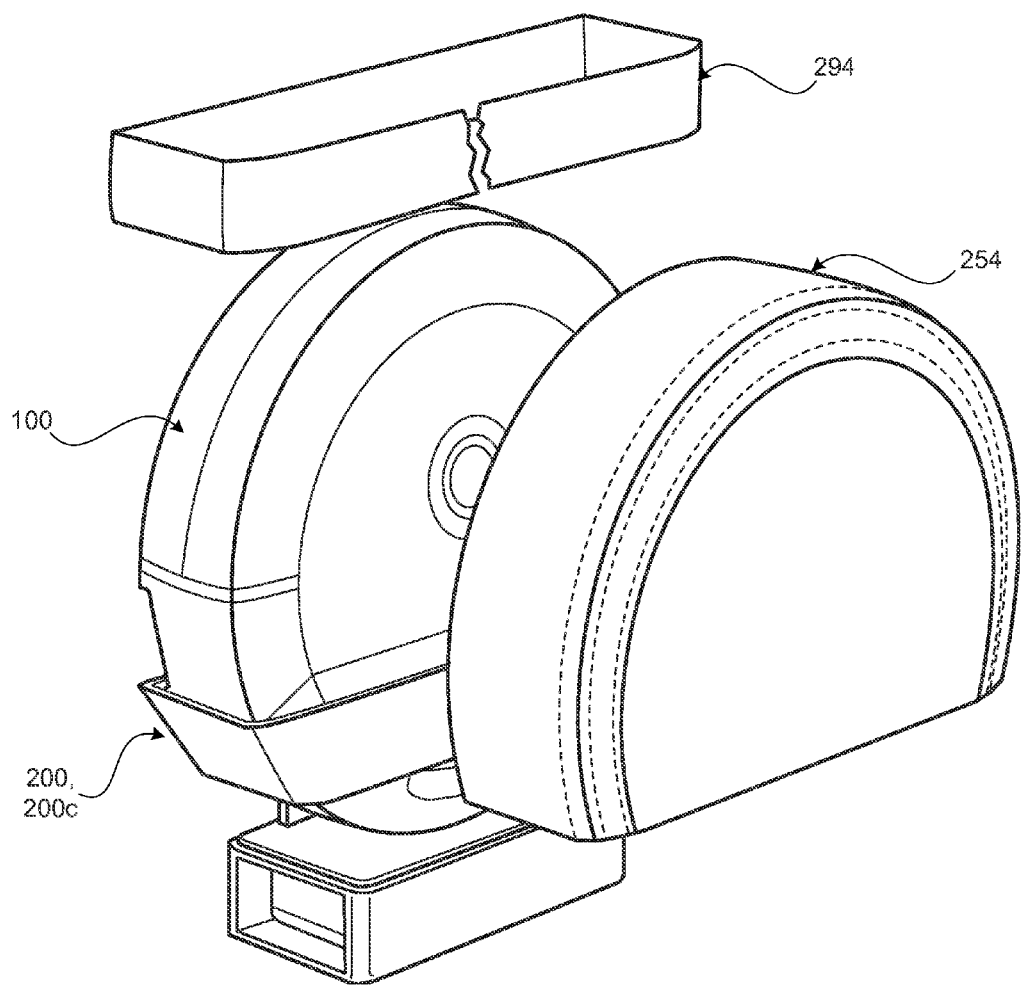
FIG. 3F is a perspective view of an exemplary coverage robot being removed from the packaging/docking station shown in FIGS. 3D and 3E.

The docking station 200c can be packaged with the robot 100 and the cover 254 as shown in FIGS. 3D-3F. A breakable strip 294 wraps around the cover 254 to contain the docking station 200c along with the robot 100. Once the user is ready to open the packaging and use the robot 100, the user breaks the breakable strip 294 and removes the cover and can use the robot 100 for cleaning. Additionally, or alternatively, the packaged docking station 200c may further be placed in a box.

Figure 4A:
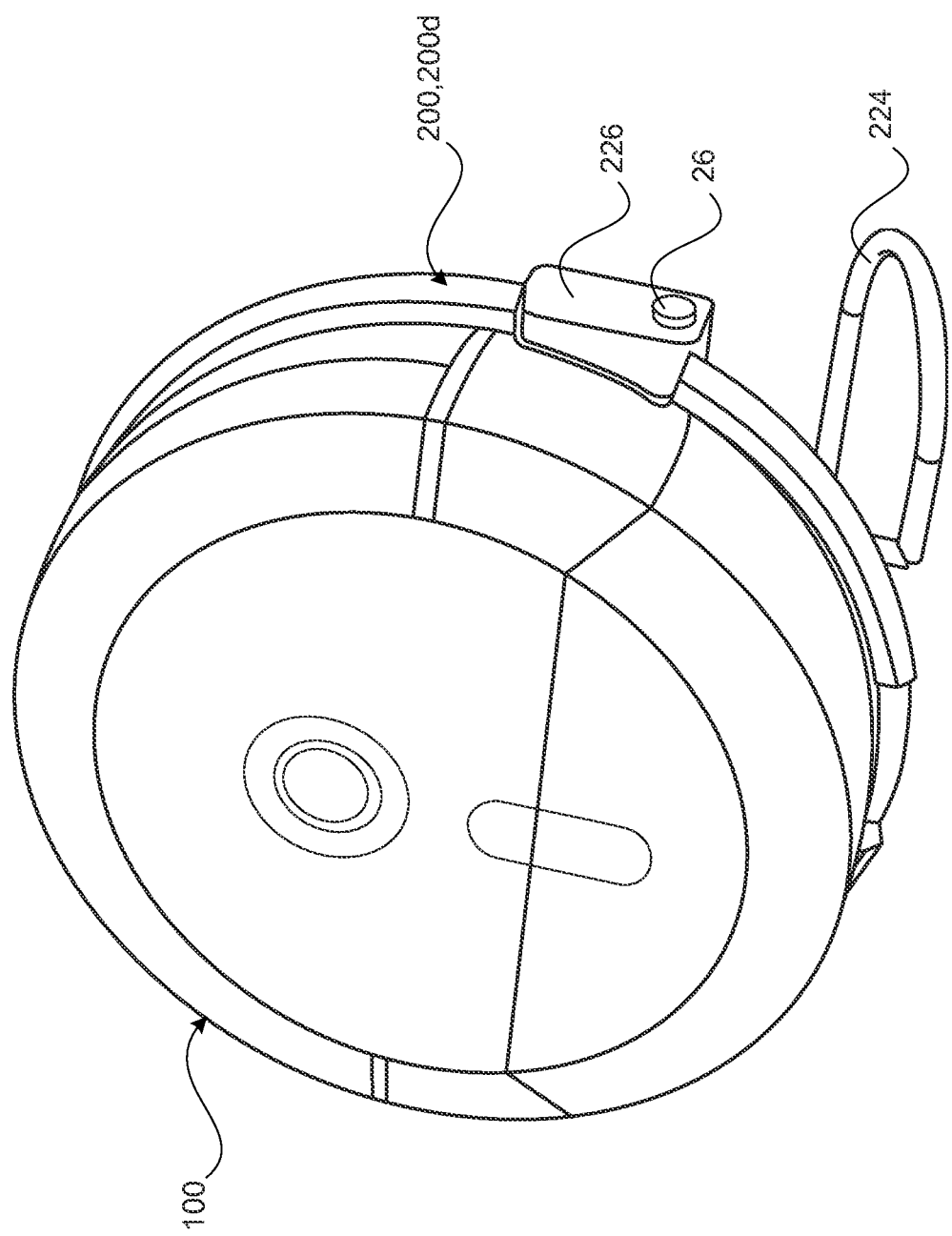
FIG. 4A is a front perspective view of an exemplary coverage robot docking station with a docket robot.
Figure 4B:
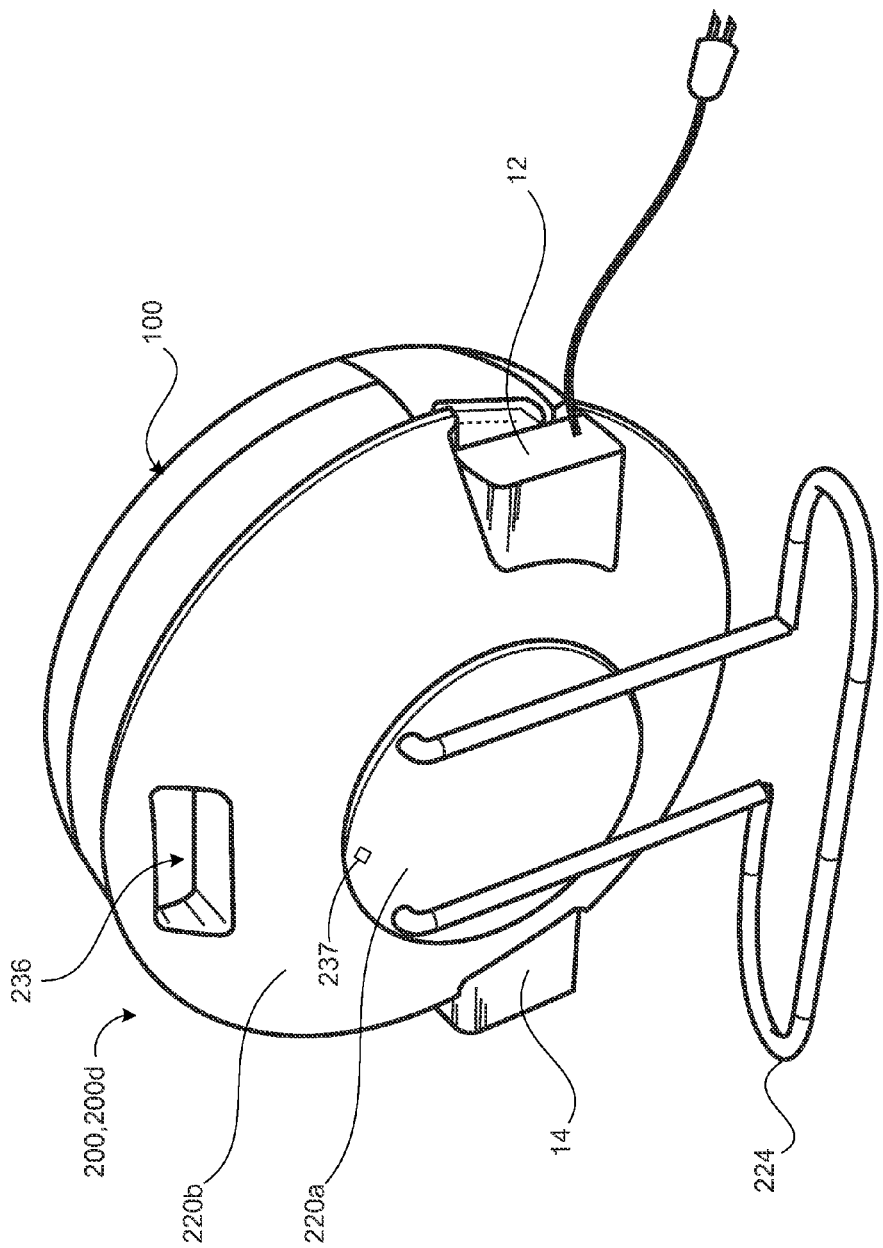
FIG. 4B is a side perspective view of the coverage robot docking station shown in FIG. 4A.
Figure 4C:
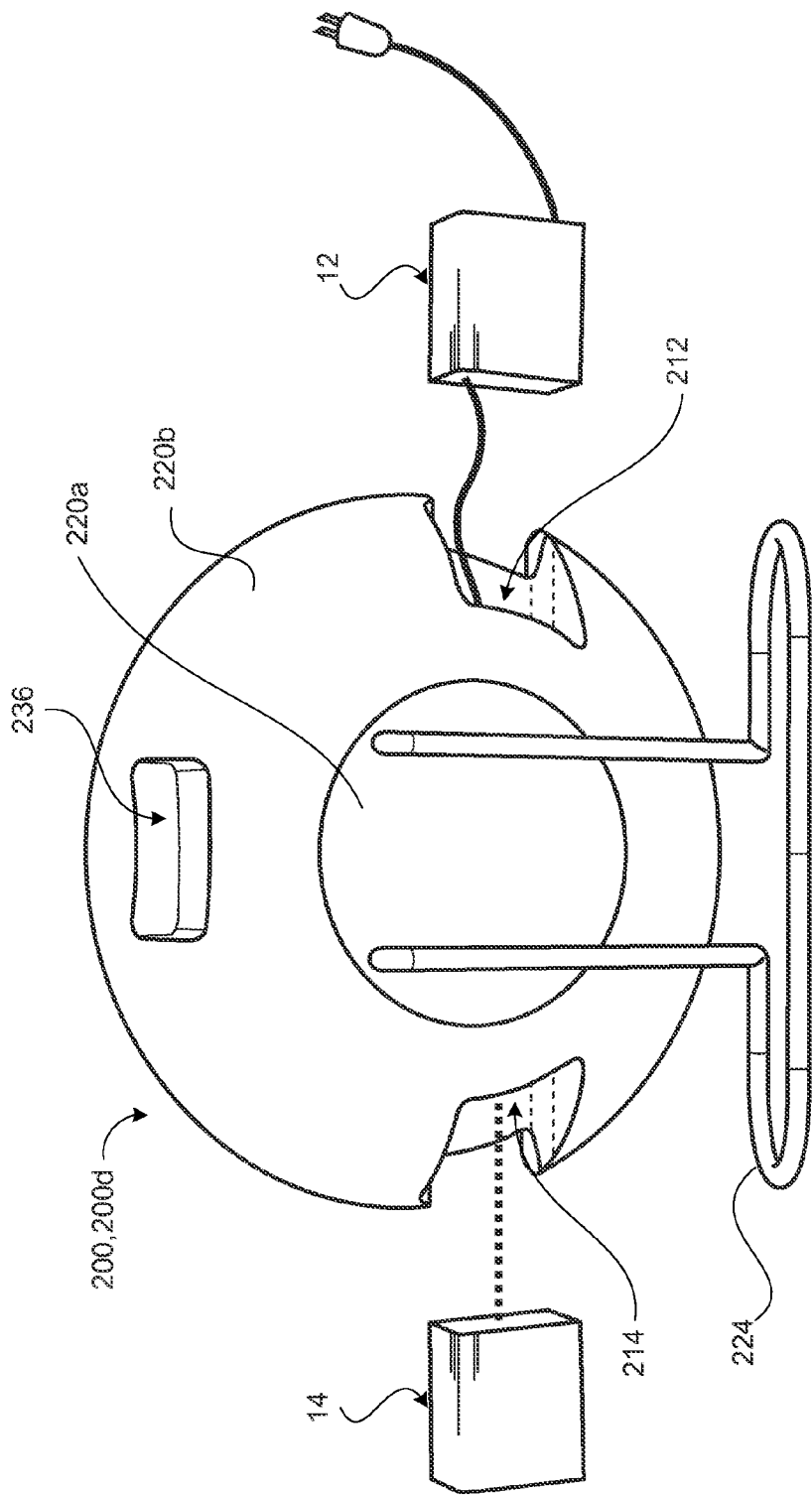
FIG. 4C is a back perspective view of the coverage robot docking station shown in FIG. 4A.
Figure 4D:
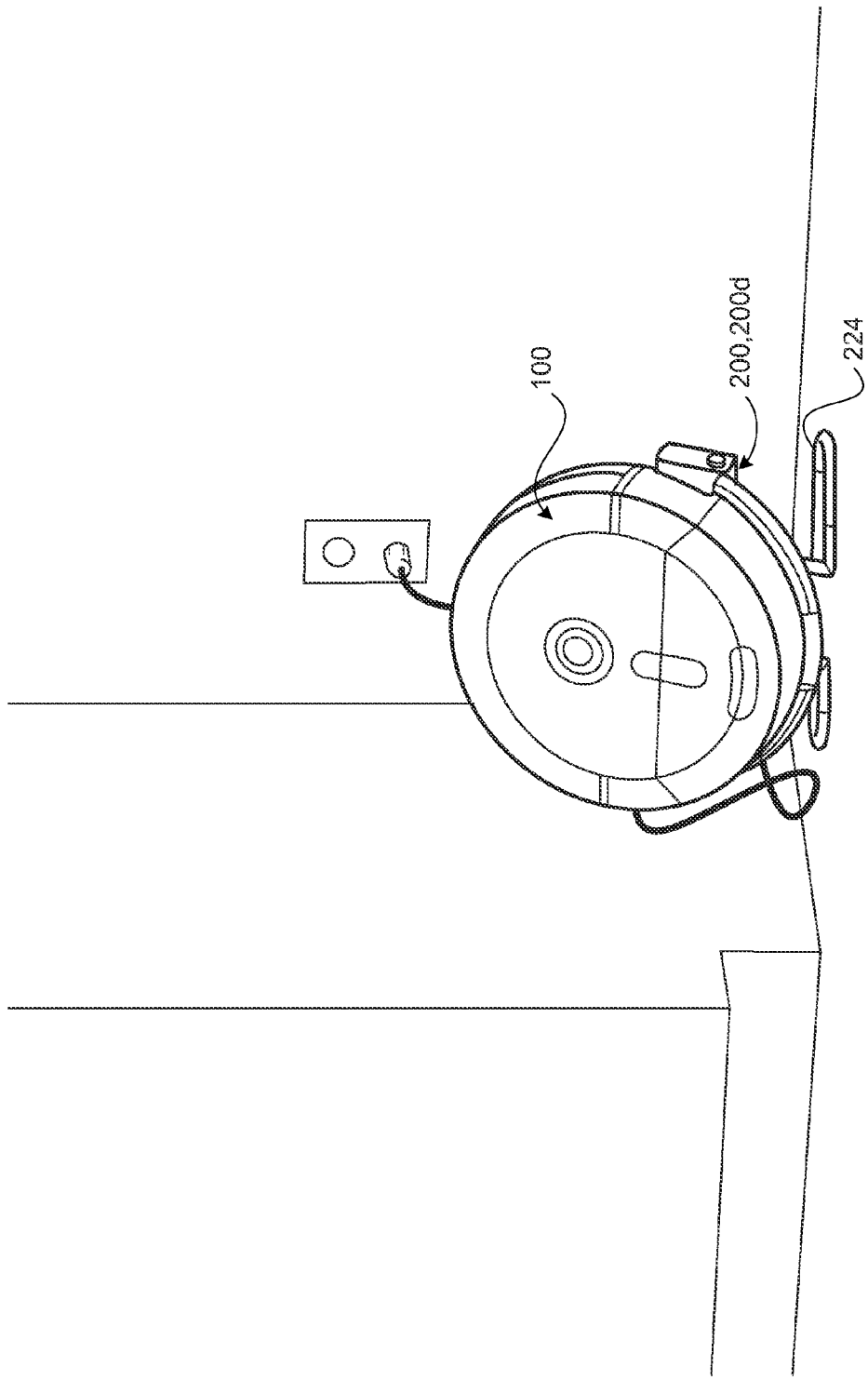
FIG. 4D is a perspective view of the coverage robot docking station shown in FIG. 4A with a docket robot being charged.

Referring to FIGS. 4A-4H, in some implementations, a docking station 200, 200d includes a base 210 with a receiving surface 250, and a pair of charging contacts 252 disposed on the receiving surface 250. In the example shown, the base 210 defines a complimentary shape of the robot 100 from a top view; however, the base 210 may define other non-complimentary shapes of the robot 100 (e.g., circular, rectangular, square, oval). The base 210 has a back surface 220 with a flat back portion 220a and a curved back portion 220b. The curved back portion 220 of the base 210 defines a power receptacle 212 for releasably retaining a power supply 12. The power receptacle 212 may be located in any position within the curved back portion 220b. Additionally or alternatively, the curved back portion may define a beacon receptacle 214 for releasably retaining a beacon 14. FIG. 4C shows only one beacon receptacle 214; however, multiple beacon receptacles 214 may be housed in the curved back portion 220b of the base 210. The curved back portion 220b defines a handle aperture 236 positioned at a distal end back surface 220. In the example shown, one handle aperture 236 is displayed; however, another handle aperture may be defined at a distal end of the back surface opposite to the other handle aperture 236. Additionally or alternatively, other types of carrying mechanisms may be used and include, but are not limited to, cup pull handle, drop pull handle, arch pull handle, or bar pull handle.

A detachable stand 224 can be disposed on the flat back portion 220a of the back surface 220. In some examples, the detachable stand 224 has a frame formed of a wire rod (e.g., steel, plastic) with two distal ends connected to the flat back surface portion 220a. A mid portion of the wire rod lays flat on a planner surface in order to hold the docking station 200d in a tilted position. Additionally or alternatively, the stand may be collapsible for ease of storage and the curved back portion 220b define a receptacle for releasably inserting and storing the wire stand. Moreover, the stand may be of other shapes such as the bottom flat side may be circular, or a tripod may hold the docking station 200d.

An annular rim 216 protrudes from the receiving surface 250. The annular rim 216 releasably retains the robot 100. Additionally or alternatively, the annular rim 216 may have at least one eject mechanism 226 having an eject button 26. The eject mechanism 226 secures the robot 100 on the base 210, allowing the user to carry or hang the docking station 200d without the risk of the robot 100 falling. When the user pushes the eject button 26, the robot 100 is released and the user can then use the robot 100.

Figure 4F:
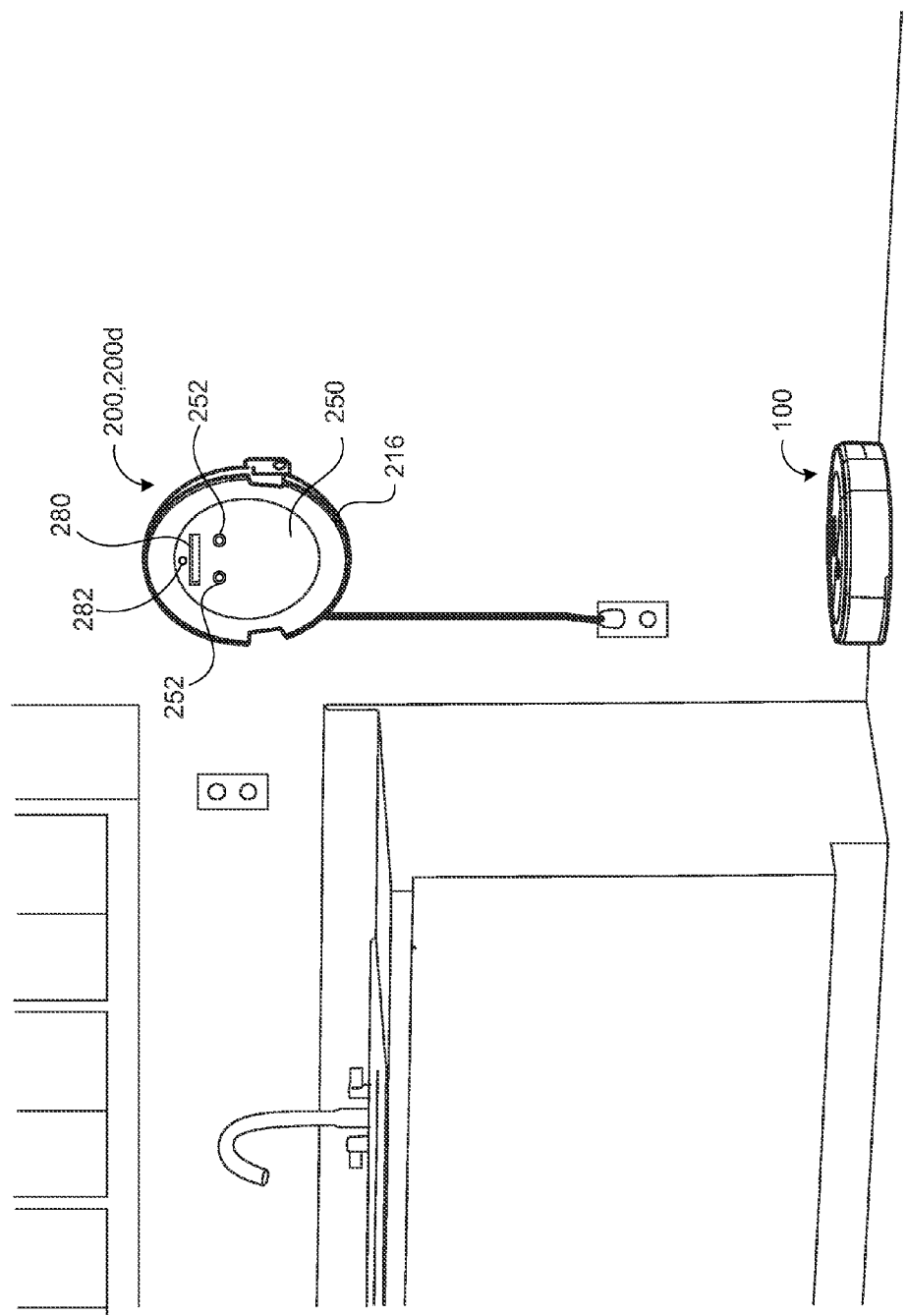
FIG. 4F is a perspective view of the coverage robot docking station shown in FIG. 4A mounted on a wall.
Figure 4G:
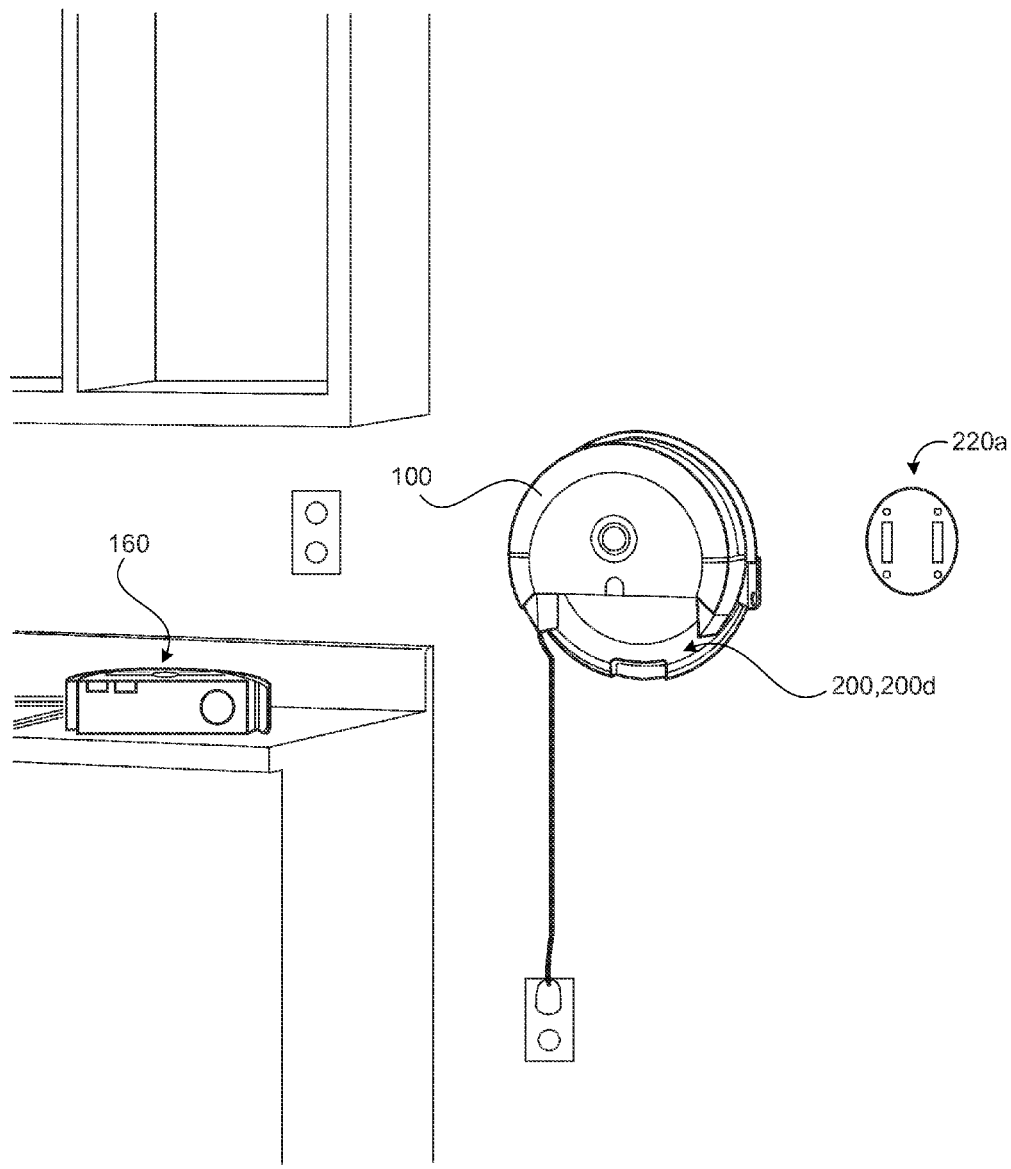
FIG. 4G is a perspective view of the coverage robot docking station shown in FIG. 4A mounted on a wall with a robot attached and its liquid container removed.

As shown in FIGS. 4E-4F, the flat back portion 220a of the back surface 220 is advantageous for laying the docking station 200d flat on its back on a planar surface (e.g., floor, counter, table), or to hang the docking station 200d on a wall. A wall mount fixture 237 may be attached to the flat back portion 220a of the base 210 for attaching the docking station 200d to a wall mount, as shown in FIGS. 4B and 4F.

In some implementations, the robot 100 has a wet cleaning system, with a liquid container 160 storing clean and waste fluid. It is beneficial to a user to have easy access to the liquid container 160 to fill up or empty the clean and waste fluids. Therefore, the robot 100 is positioned in such a way on the docking station 200d where the user can easily access and remove the liquid container 160 without interrupting the charging of the robot 100, see FIG. 4H.

Referring again to FIG. 4F, the docking station 200, 200d may include an air mover or blower 280 (e.g., fan and nozzle) disposed on the robot receiving surface 250 (or any other portion) for moving air into and/or onto the wet cleaning system of the received robot 100. Drying out the wet cleaning system can reduce the probability of bacterial formation. The blower 280 can be activated by a robot detector 282 (e.g., contact switch, magnetic switch and/or sensor) disposed on the robot receiving surface 250 (or any other applicable portion).

Figure 5A:
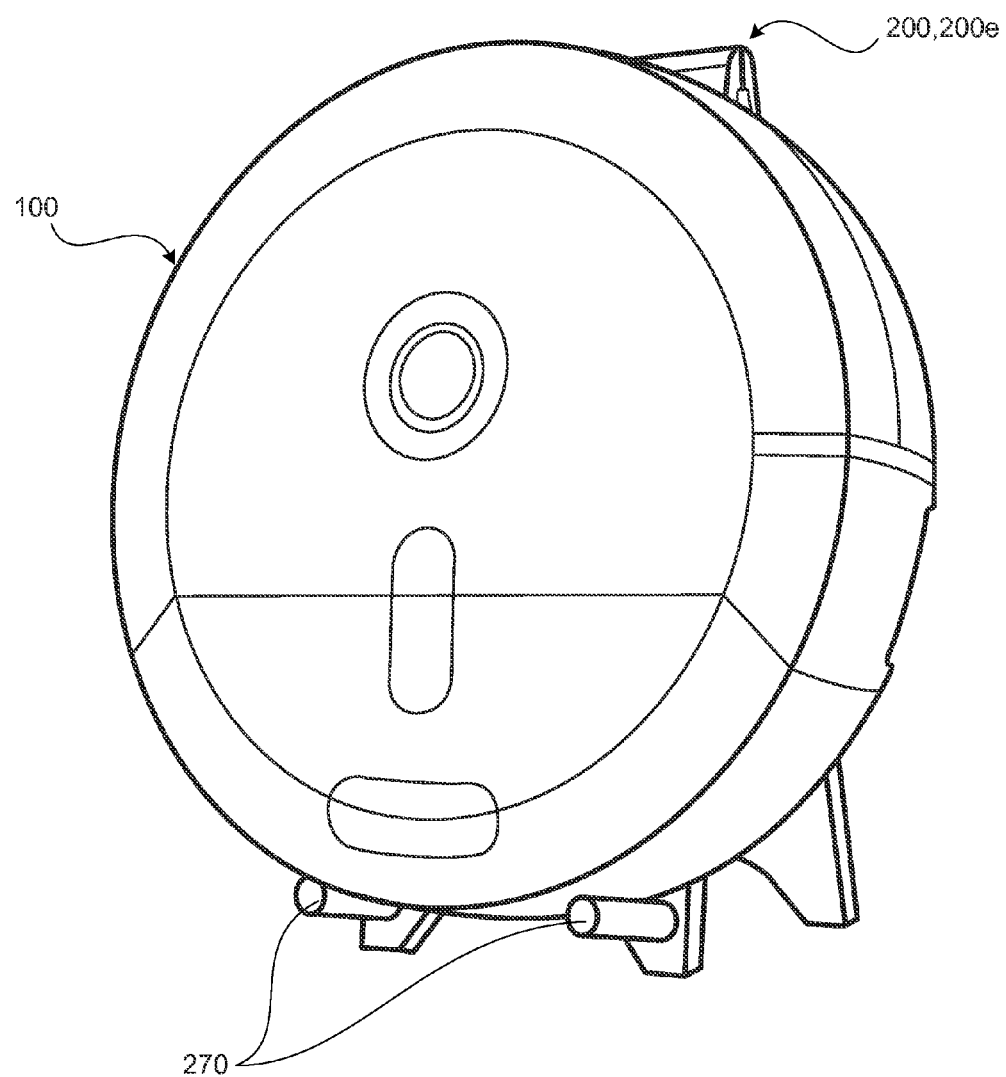
FIG. 5A is a perspective view of an exemplary coverage robot docking station with a docket robot.
Figure 5B:
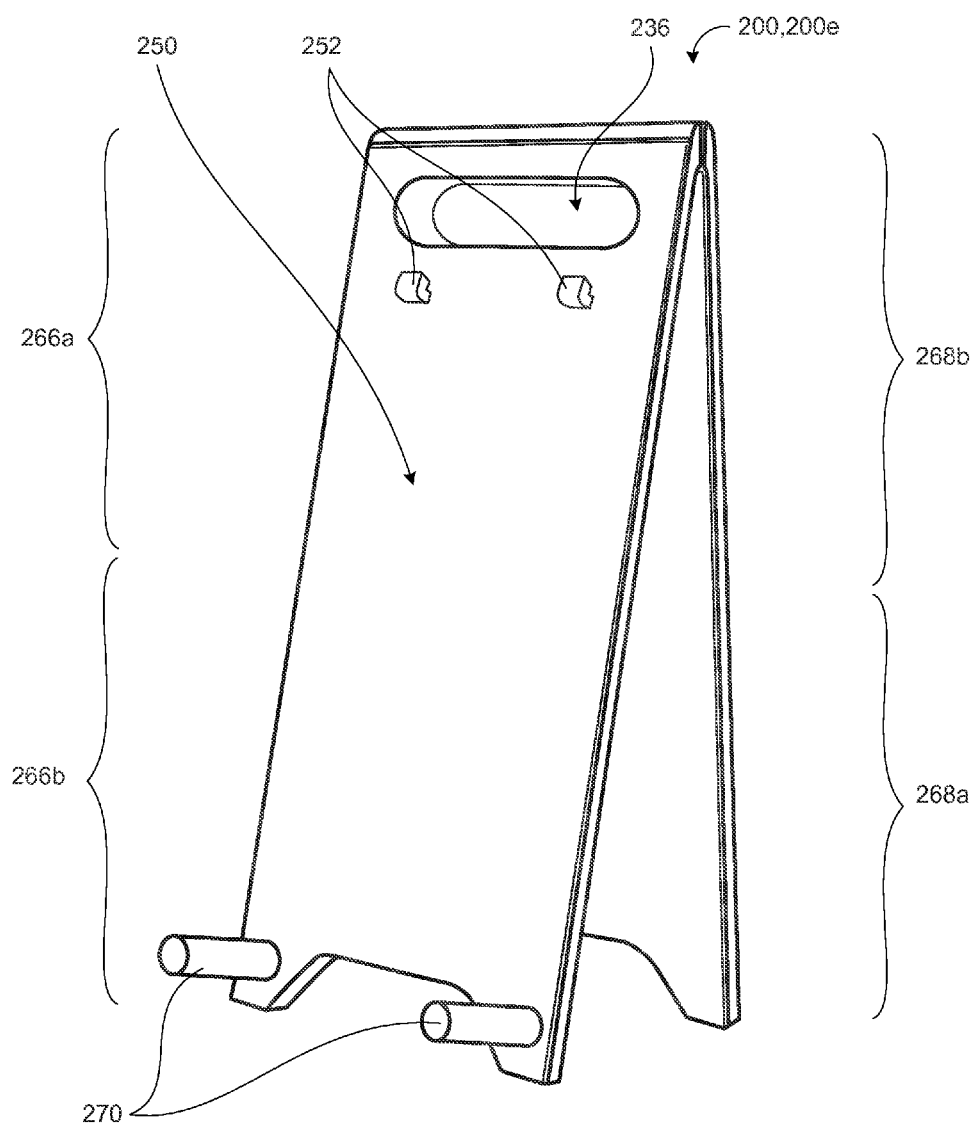
FIG. 5B is a perspective view of the coverage robot docking station shown in FIG. 5A.
Figure 5D:
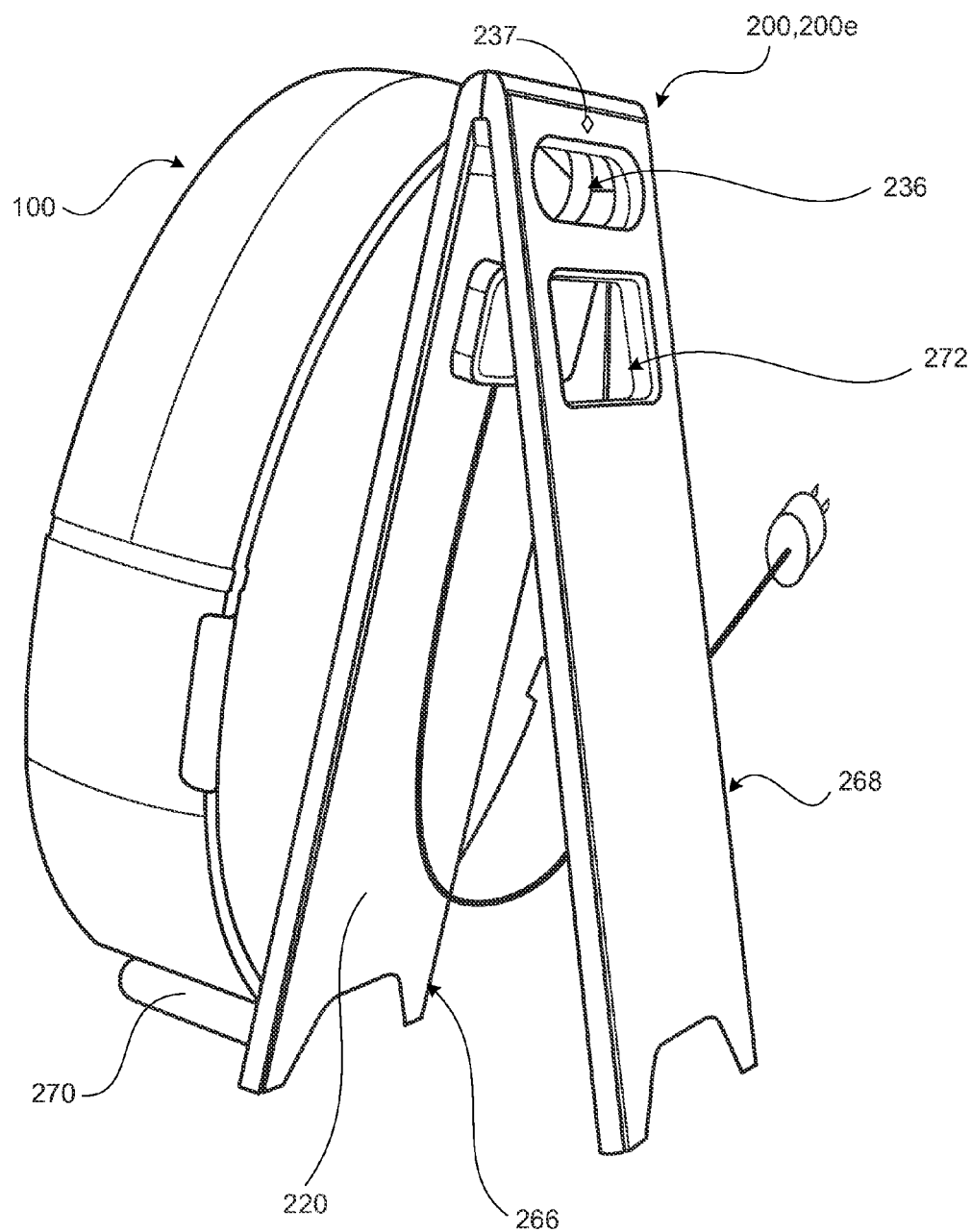
FIG. 5D is a perspective view of the coverage robot docking station shown in FIG. 5A with a docked robot.

Referring to FIGS. 5A-5F, in some implementations, the docking station 200, 200e has a first panel 266 and a second panel 268. The first panel 266 has a first portion 266a and a second portion 266b, a receiving surface 250, and a back surface 220 opposite to the receiving surface 250. The second panel 268 has a first end portion 268a and a second end portion 268b. The first end portion 268a of the first panel 266 is pivotally coupled to the second end portion 268b of the second panel 268. In the example shown, the first panel 266 and the second panel 268 move between a stowed position and a deployed position (FIG. 5B). In their stowed position the panels 266, 268 are side-by-side substantially parallel to each other. In their deployed position, the panels 266, 268 are arranged at an angle with respect to each other forming a standing inverted V-frame. Additionally or alternatively, the inner side of the panels may be connected with a spring chain to provide additional support, thus forming a standing inverted A-frame. As shown, the first and second panels 266, 268 define a handle aperture 236 for carrying the docking station 200e. Different handles may be used and may be attached to the panels. The second panel 268 may define a wall mount fixture 237 for attaching the docking station to a wall mount or wall.

The receiving surface 250 has a pair of charging contacts 252 to allow the robot 100 to continuously charge, thus extending the life of the robot 100. In the example shown, the receiving surface 250 has two support pegs 270 on a distal end of the second end portion 268b of the first panel 266 to support the robot 100; however, other support mechanisms may be used. Some examples of support mechanisms may include, but are not limited to, a support board disposed perpendicularly to the first panel 266 to support the robot 100, the board may be straight or concave to mimic the shape of the robot 100. Additionally or alternatively, the receiving surface may have a fastener mechanism to releasably retain the robot 100 in position.

A power supply 12 may be disposed on the back surface 220 of the first end 268a of the first panel 266 in electric communication with the pair of charging contacts 252. The second portion 268b of the second panel 268 defines a void 272 to receive the power supply 12 when the first and second panels are in the stowed position.

Figure 5E:
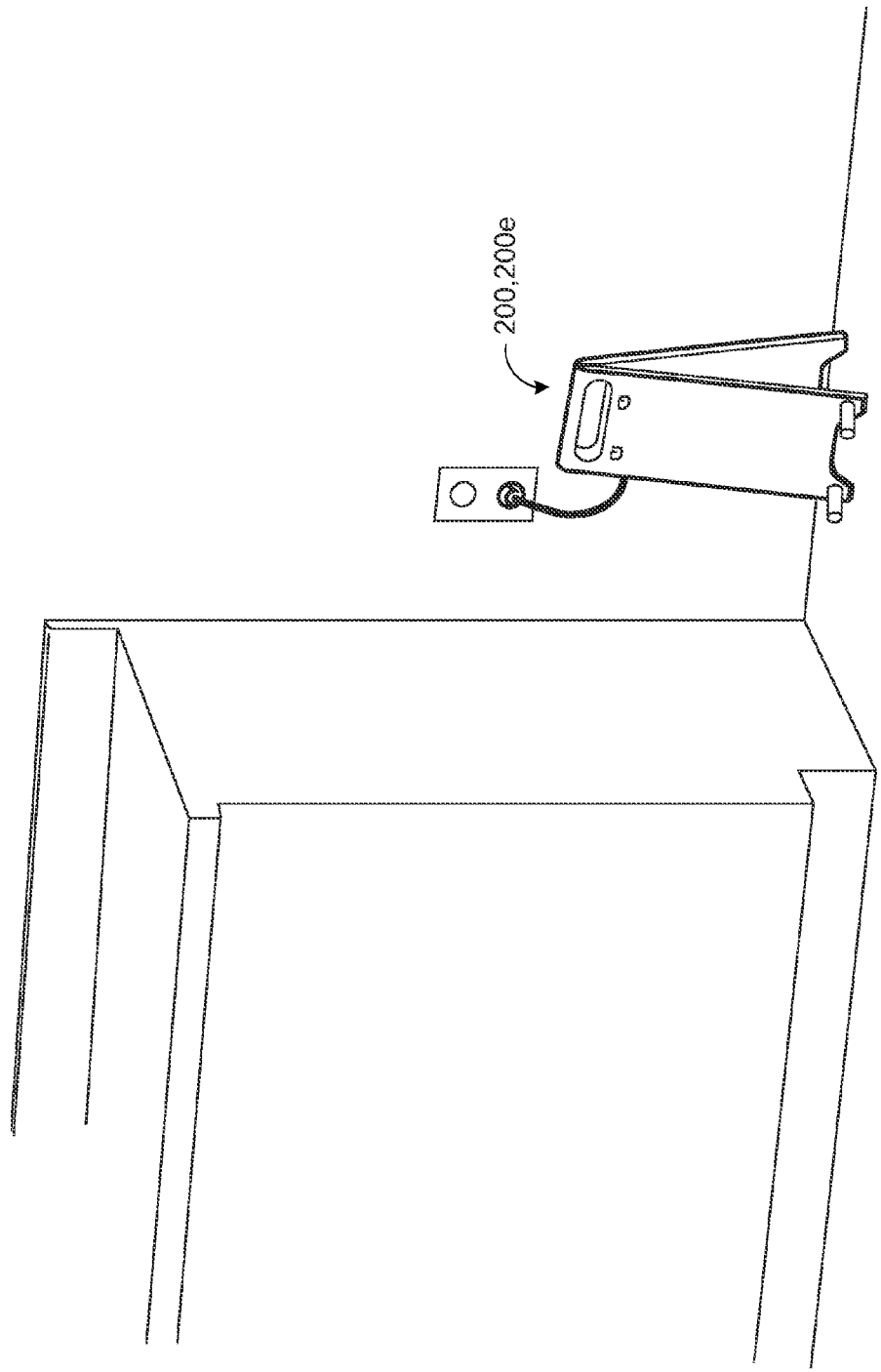
FIG. 5E is a perspective view of the coverage robot docking station shown in FIG. 5A with a charging cord.
Figure 5F:
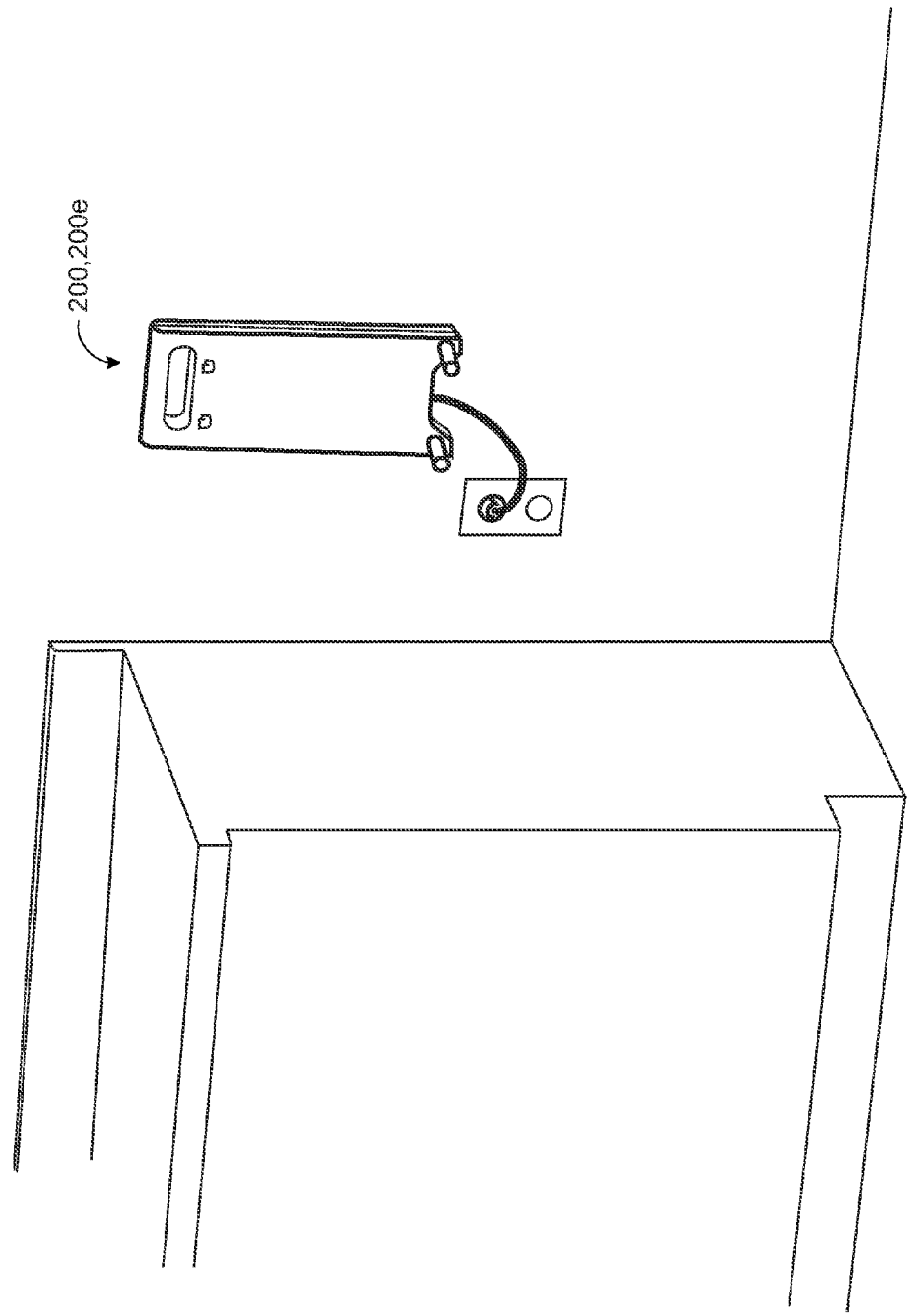
FIG. 5F is a perspective view of the coverage robot docking station shown in FIG. 5A mounted on a wall.
Figure 5G:
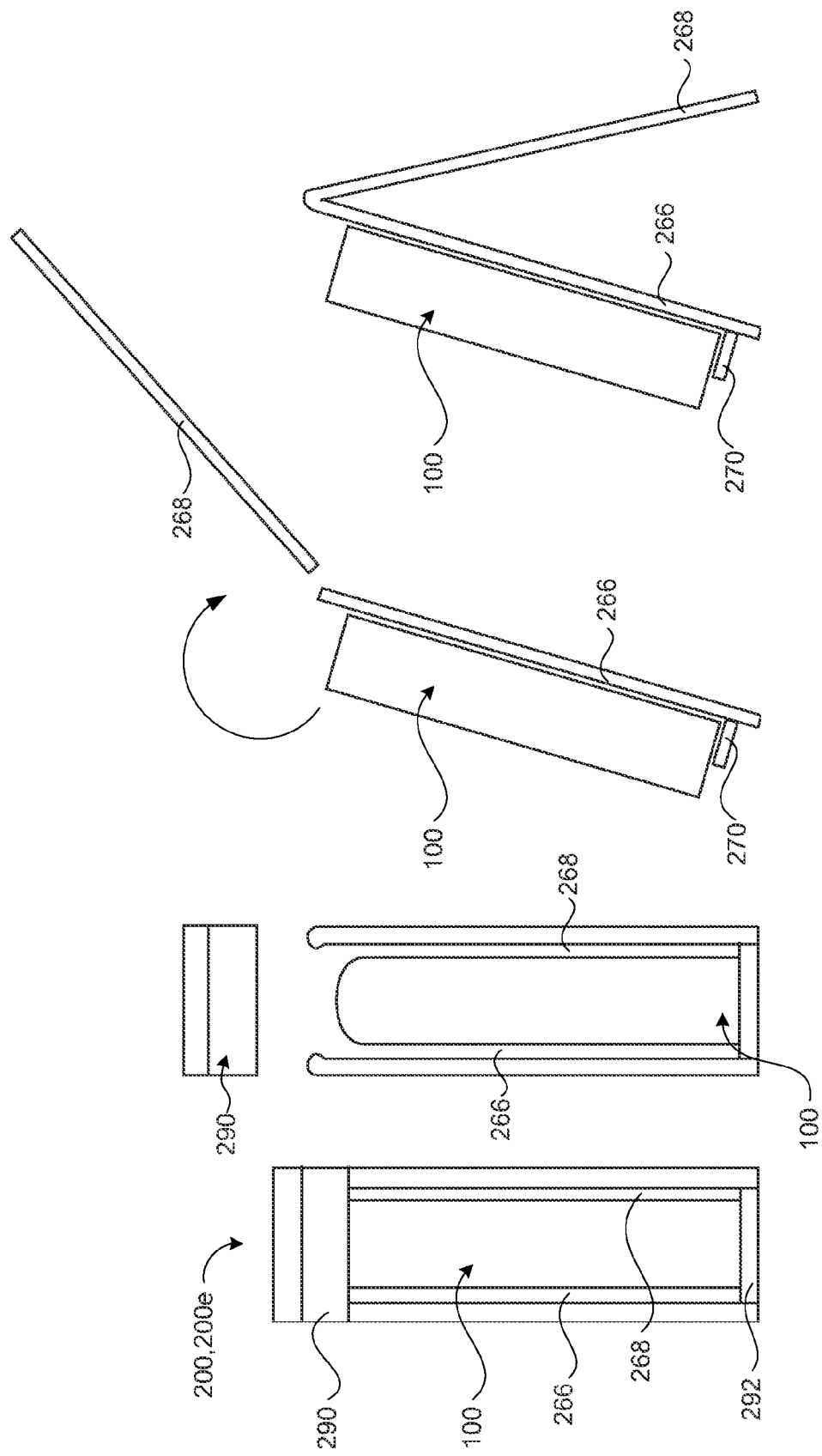
FIG. 5G is a perspective view of the coverage robot docking station shown in FIG. 5A moving between a packaging position to the deployed position, while holding a coverage robot.
Figure 5H:
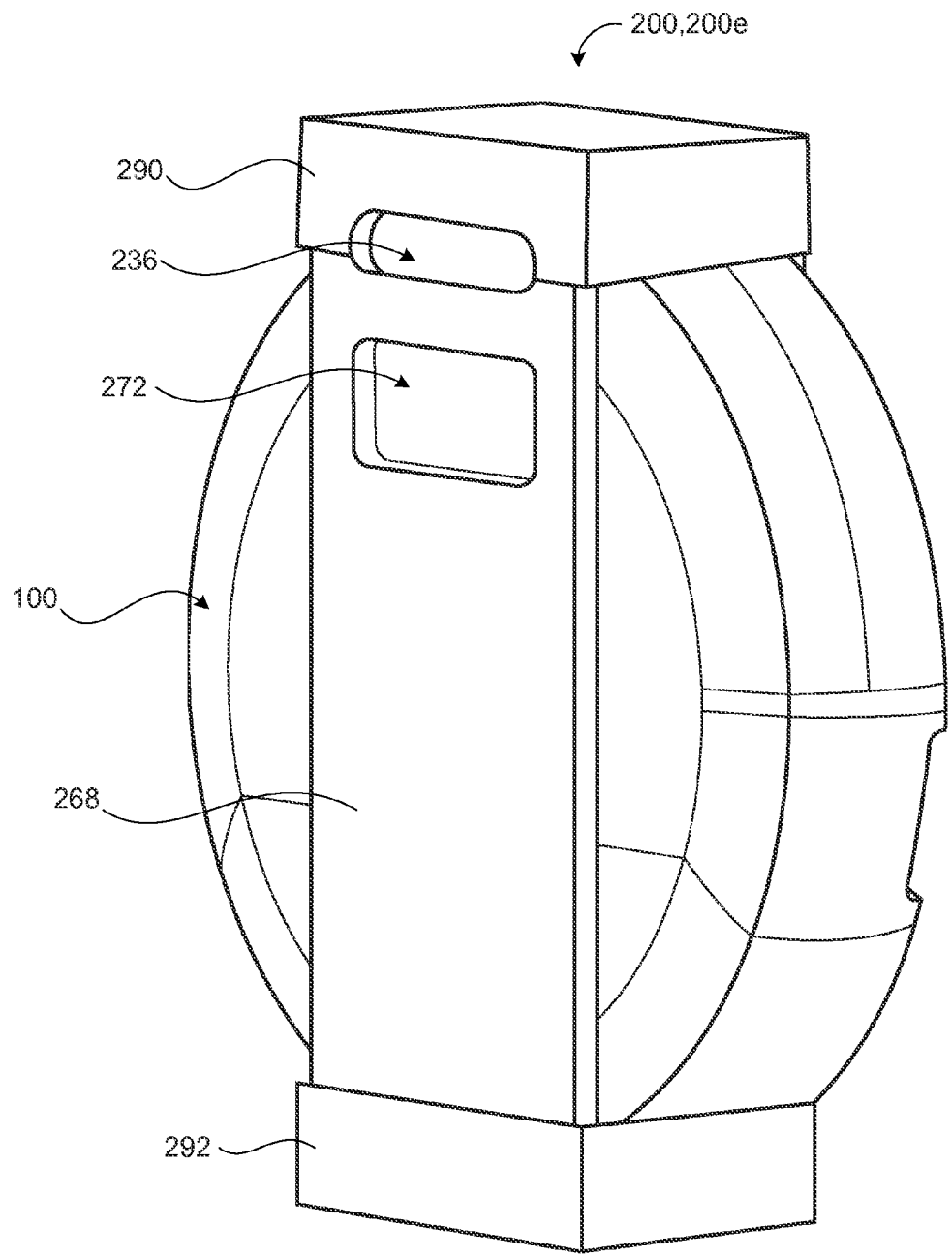
FIG. 5H is a back perspective view of the coverage robot docking station shown in FIG. 5G while in its packaging position.

Referring to FIGS. 5E-5F, in some implementations, the robot 100 is packaged with the docking station 200e. The first panel 266 is detached from the second panel 268, and both panels stand side-by-side with the robot 100 in-between. A top cover 290 contains the first end 266a of the first panel 266 and the second end 268b of the second panel 268. While a bottom cover 292 contains the second end 266b of the first panel 266 and the first end 268a of the second panel 268. The docking station 200e may include instructions explaining how to assemble the docking station 200e. When the user opens the package containing the robot 100 and the docking station 200e, the user removes the top and bottom covers 290, 292, flips the second panel 268 and attaches the first end 266a of the first panel 266 to the second end 268b of the second panel 268, so the panels 266, 268 can pivotally rotate.

Figure 6A:
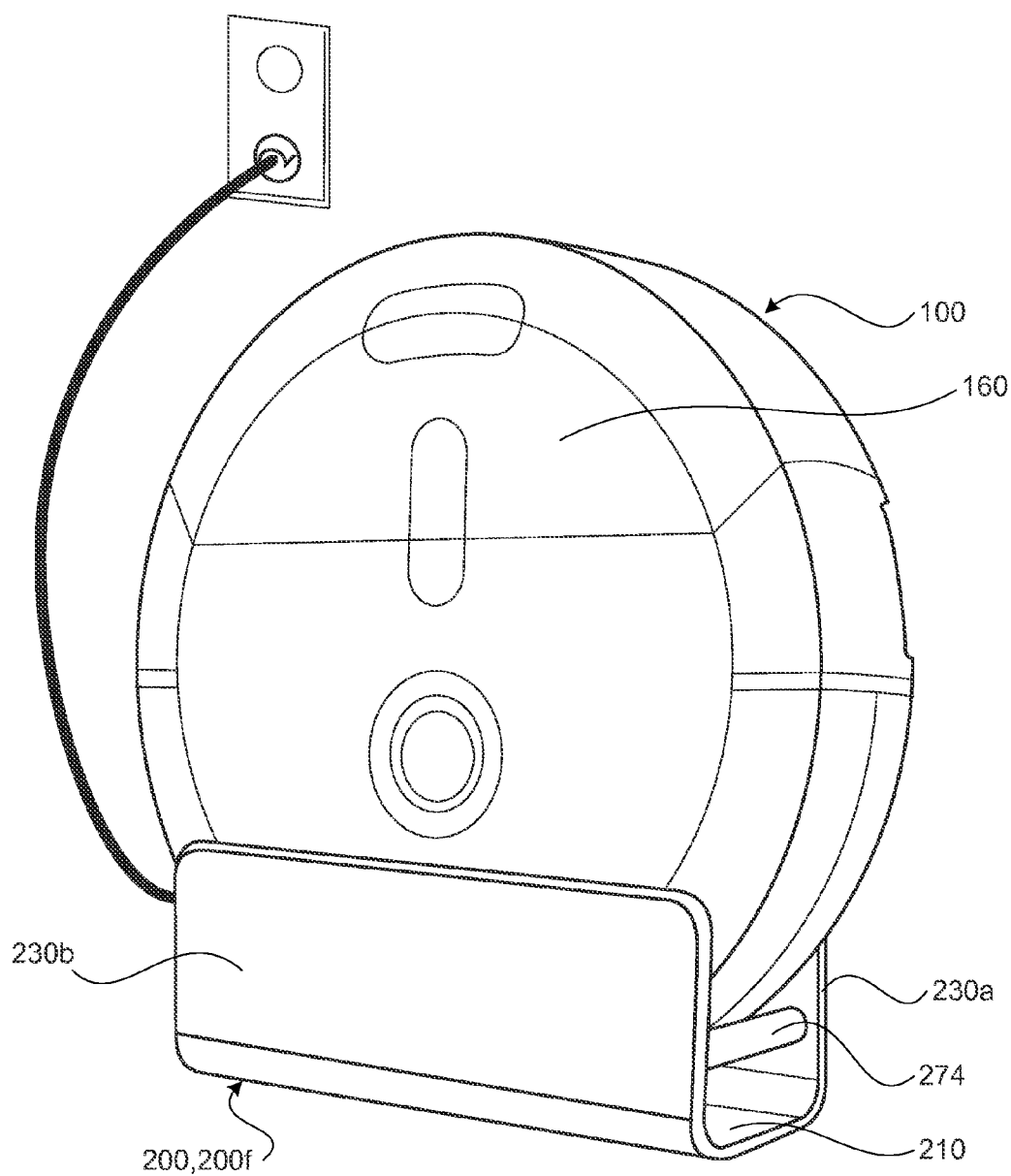
FIG. 6A is a perspective view of an exemplary coverage robot docking station with a docked robot.
Figure 6B:
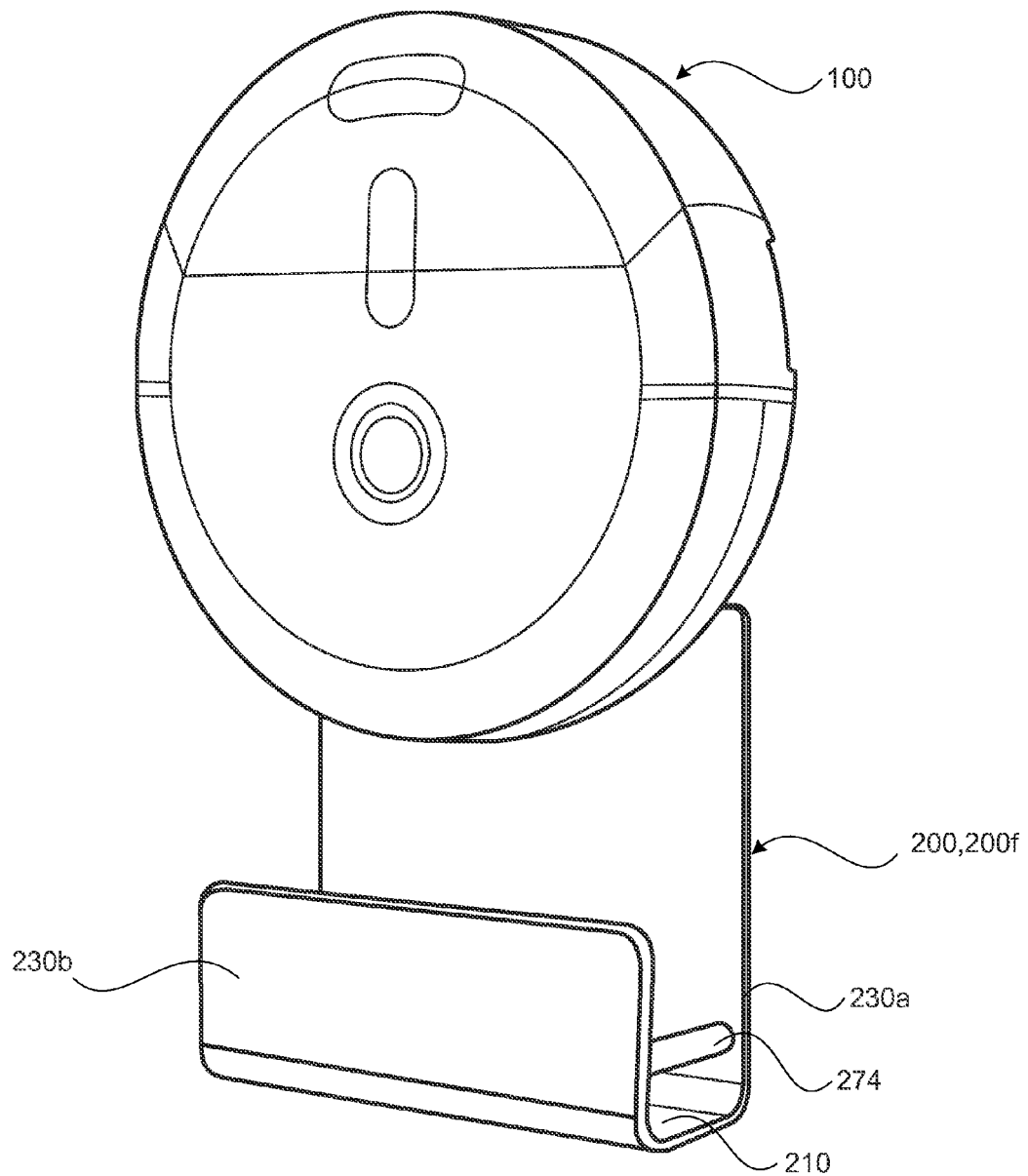
FIG. 6B is a perspective view of the coverage robot docking station shown in FIG. 6A with a docked robot being removed from the docking station.
Figure 6C:
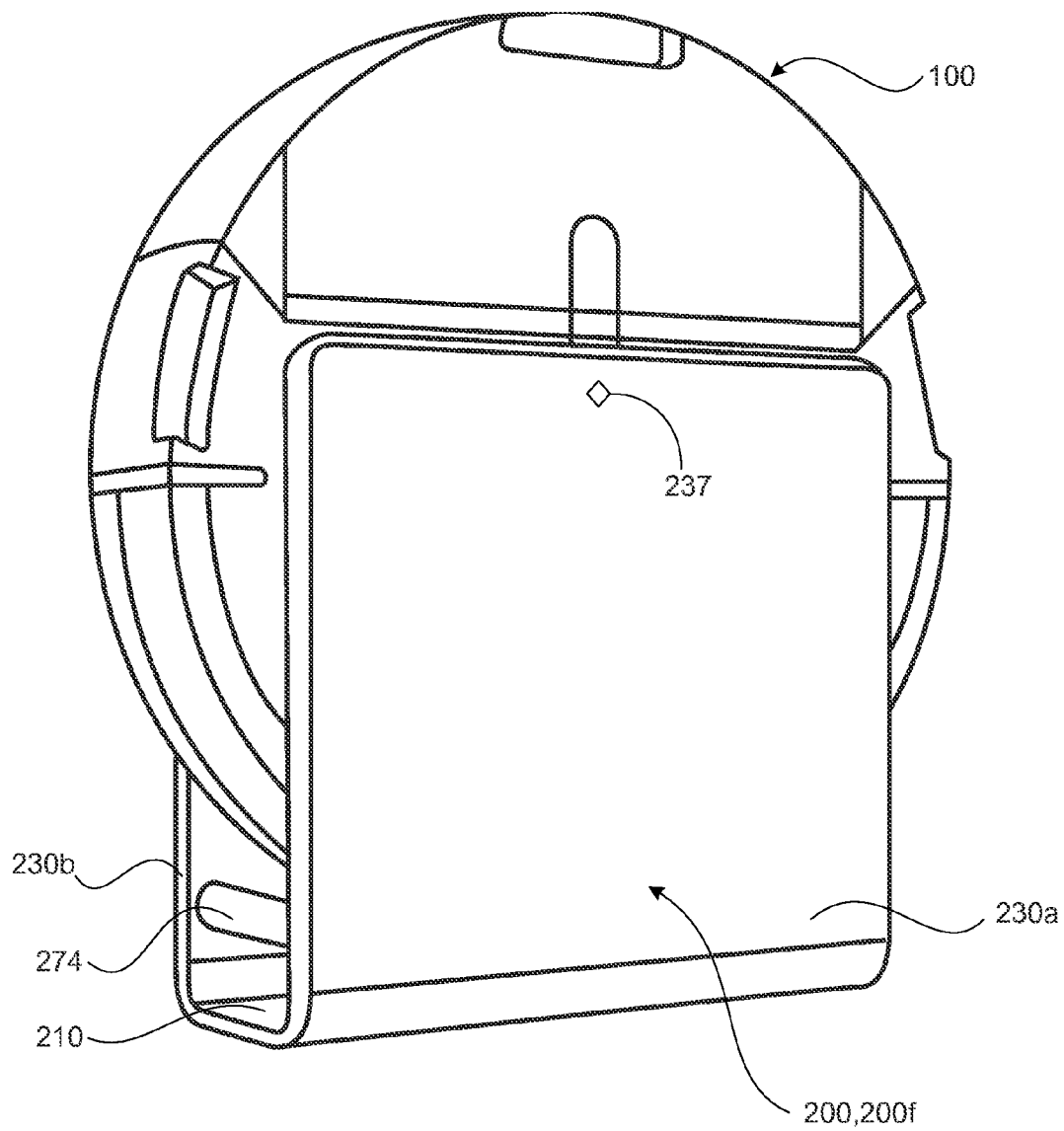
FIG. 6C is a back perspective view of the coverage robot docking station shown in FIG. 6A with a docked robot.
Figure 6D:
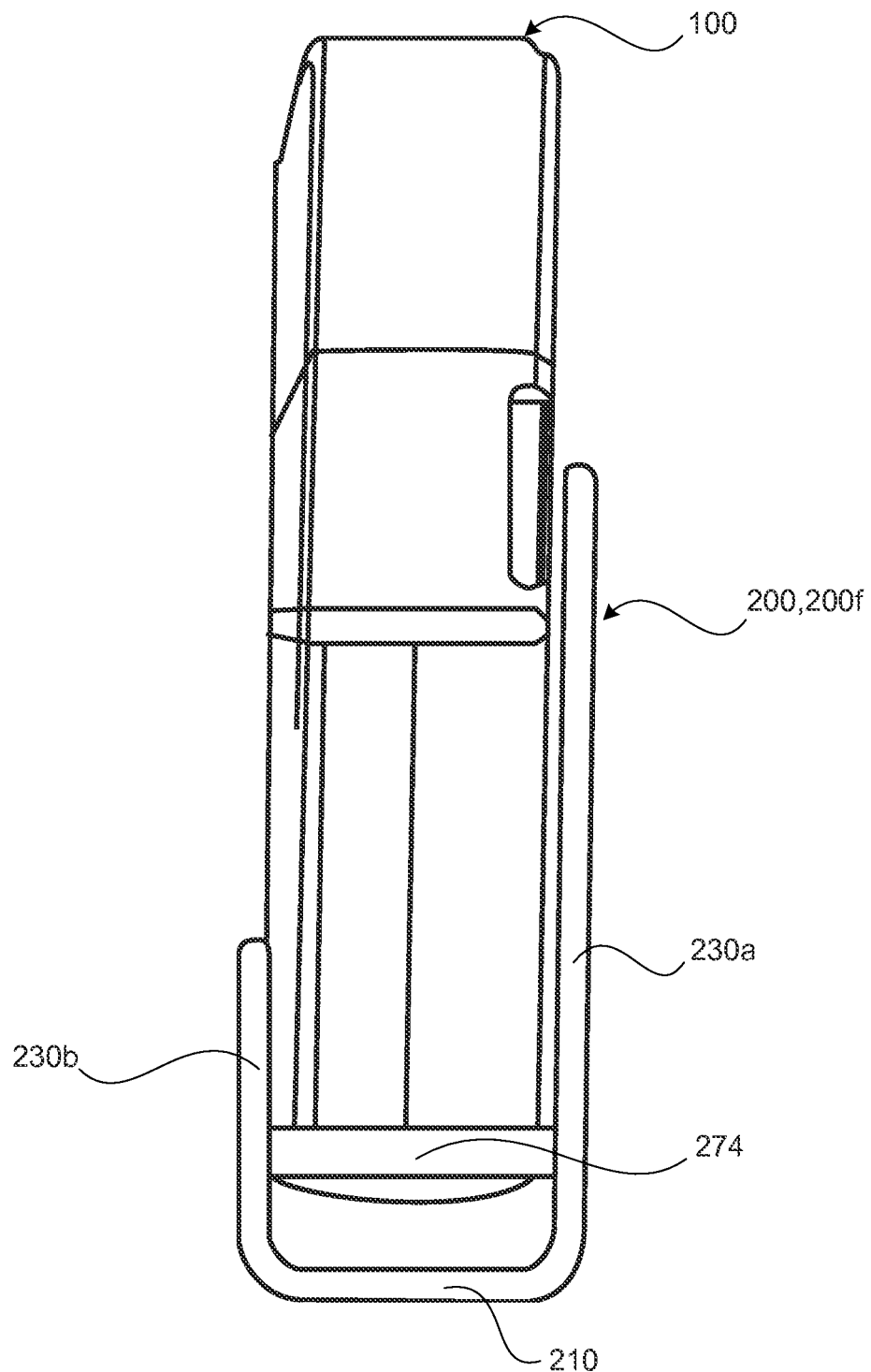
FIG. 6D is a side perspective view of the coverage robot docking station shown in FIG. 6A with a docked robot.

Referring to FIGS. 6E-6F, in some implementations, the docking station 200, 200f has a base 210 and first and second side walls 230a, 230b extending from the base 210. Together the base 210 and the side walls 230a, 230b define a robot holder 232. The first wall 230a and the second wall 230b are parallel with respect to each other and connected via two rods 274. As shown, the first wall 230a has a square shape and the second wall 230b has a rectangular shape; however, the side walls 230a, 230b can have other shapes including, but are not limited to, rectangle, circle, oval, and hexagon. The rods 274 are location between about 0.25 inch and about 2 inches above the base 210 on the bottom ends of each side wall 230a, 230b. The rods 274 support the robot 100 while received in the docking station 200f.

In some implementations, the docking station 200f includes wall mount fixture 237 attached to the back side of the first wall 230a for attaching the docking station to a wall mount. Additionally or alternatively, the base 210 of the docking station 200f may be flat allowing it to stand on a planar surface.

Referring to FIGS. 1A-6D, in some implementations, the receiving surface 250 may be treated with anti-bacterial coating and/or a superhydrophobic coating, to prevent bacteria from growing, especially when using the robot 100 with the liquid container 160.

Several implementations discussed have charging units; however, the docking station 200 may not have charging contacts and the power supply 12 can be directly plugged into the robot 100 for charging.

A number of implementations have been described. Nevertheless, it will be understood that various modifications may be made without departing from the spirit and scope of the disclosure. Accordingly, other implementations are within the scope of the following claims.

What is claimed is:
1. A coverage robot docking station comprising:
a base having a robot receiving surface;

a side wall extending from the base, the side wall and the receiving surface of the base defining a robot holder that supports a received robot above a ground surface, the robot holder including a fluid collection portion arranged to collect fluid dripping from the received robot; and at least one charging contact disposed on the robot holder and configured for charging the received robot;

wherein the fluid collection portion includes a trough sized and shaped for collecting droplets of fluid dripping from wet components of the received robot on the receiving surface.

2. The coverage robot docking station of claim 1, further comprising first and second supports disposed on the robot holder and spaced from each other, the supports arranged to support the received robot away from the receiving surface, the fluid collection portion defined between the first and second supports.

3. The coverage robot docking station of claim 1, wherein the side wall is arranged to support the received robot in the inclined orientation with respect to the ground surface, the side wall guiding collection of fluid dropping from the received robot to the fluid collection portion.

4. The coverage robot docking station of claim 3, wherein the side wall is arranged for supporting the received robot in a tilted standing position partially resting on the side wall, the at least one charging contact disposed on the side wall.

5. The coverage docking station of claim 1, wherein the base defines a power receptacle for receiving a power supply.

6. The coverage docking station of claim 5, wherein the power receptacle comprises at least one retaining clip releasably engaging and retaining the received power supply.

7. The coverage docking station of claim 6, wherein the at least one retaining clip is spring biased.

8. The coverage docking station of claim 1, wherein the side wall extends from the base at an angle with respect to the receiving surface, the defined robot holder having a substantially L-shape.

9. The coverage docking station of claim 8, further comprising first and second supports disposed on the robot holder and spaced from each other, the supports arranged to support the received robot away from the receiving surface.

10. The coverage docking station of claim 9, wherein the side wall has a proximal end attached to the base and a distal end, the at least one charging contact is disposed on the distal end of the side wall.

11. The coverage docking station of claim 8, wherein the robot holder defines the fluid collection portion where the side wall meets the receiving surface.

12. The coverage docking station of claim 1, further comprising a wall mount fixture attached to a back surface of the side wall for attaching the coverage robot docking station to a wall mount.

13. The coverage docking station of claim 1, further comprising a robot retainer disposed on the robot holder for retaining the received robot in a docked position.

14. The coverage docking station of claim 13, wherein the robot retainer further comprises a nozzle for blowing air into the robot.

15. The coverage docking station of claim 1, wherein the robot receiving surface extends along at least a portion of the side wall.

16. The coverage docking station of claim 1, wherein the base defines a beacon receptacle for receiving a beacon.

17. The coverage docking station of claim 16, wherein the beacon receptacle comprises at least one retaining clip releasably engaging and retaining the received beacon.

18. The coverage docking station of claim 17, wherein the at least one retaining clip is spring biased.

19. The coverage robot docking station of claim 1, further comprising:
    an air mover arranged to move air onto the received coverage robot; and
    a robot detector arranged to detect the presence of the received coverage robot, the robot detector activating the air mover upon detecting the presence of the received coverage robot;
    wherein the air mover is positioned adjacent wet components of the received coverage robot.

20. The coverage robot docking station of claim 19, wherein the air mover comprises a fan having a nozzle disposed in the robot receiving surface to move air onto the wet components of the received coverage robot.

21. The coverage robot docking station of claim 19, wherein the air mover directs a stream of air across the wet components of the coverage robot such that droplets of fluid are moved from the wet components to the trough.

22. The coverage robot docking station of claim 19, wherein the air mover directs a heated stream of air across the wet components of the coverage robot.

23. The coverage robot docking station of claim 1, wherein the received coverage robot comprises an exhaust fan housed in the coverage robot and the receiving surface directs a stream of exhaust air from the exhaust fan across the wet components of the coverage robot.

* * * * *